United States Patent
Ing et al.

(10) Patent No.: US 7,511,711 B2
(45) Date of Patent: Mar. 31, 2009

(54) METHOD FOR LOCATING AN IMPACT ON A SURFACE AND DEVICE THEREFOR

(75) Inventors: Ros Kiri Kiri Ing, Paris (FR); Stefan Catheline, Montreuil (FR); Nicolas Quieffin, Paris (FR); Mathias Fink, Meudon (FR)

(73) Assignee: Sensitive Object, Boulogne-Billancourt (FR)

( * ) Notice: Subject to any disclaimer, the term of this patent is extended or adjusted under 35 U.S.C. 154(b) by 88 days.

(21) Appl. No.: 11/024,514

(22) Filed: Dec. 28, 2004

(65) Prior Publication Data

US 2005/0212777 A1   Sep. 29, 2005

Related U.S. Application Data

(63) Continuation-in-part of application No. 10/518,152, filed as application No. PCT/FR03/01769 on Jun. 12, 2003.

(30) Foreign Application Priority Data

Jun. 12, 2002   (FR) ................... 02 07208

(51) Int. Cl.
*G06T 15/00* (2006.01)
(52) U.S. Cl. .................. 345/424; 345/173; 345/182; 702/54; 702/71
(58) Field of Classification Search ................ 345/419, 345/424, 173, 177, 182; 702/54, 56, 71
See application file for complete search history.

(56) References Cited

U.S. PATENT DOCUMENTS

| | | | |
|---|---|---|---|
| 4,317,227 A | 2/1982 | Skerlos | 455/180.4 |
| 5,059,959 A | 10/1991 | Barry | 345/168 |
| 5,194,852 A | 3/1993 | More et al. | 345/182 |
| 5,404,458 A | 4/1995 | Zetts | 710/73 |
| 5,412,189 A | 5/1995 | Cragun | 235/379 |

(Continued)

FOREIGN PATENT DOCUMENTS

EP   0474 232 A2   3/1992

(Continued)

OTHER PUBLICATIONS

Fink, M., "Time-Reversed Acoustics," 1999, Scientific American, Nov. 1999, pp. 91-97.

(Continued)

*Primary Examiner*—Phu K Nguyen
(74) *Attorney, Agent, or Firm*—Jones Day; Brett Lovejoy

(57) ABSTRACT

Apparatus and methods for locating an impact point on a surface of an object. The object is provided with an acoustic sensor that senses the impact from the acoustic waves that are generated when the object is subjected to the impact. The location of the impact on the surface of the object is determined by a recognition step that includes a comparison of the sensed signal to one or more predetermined signals. Each predetermined signal represents an active zone on the surface of the object. A predetermined signal corresponds to the sensed signal when the impact causing the sensed signal is generated in the active zone represented by the predetermined signal. The impact is associated with the active zone represented by a predetermined signal when the sensed signal and the predetermined signal sufficiently correspond to each other.

50 Claims, 7 Drawing Sheets

U.S. PATENT DOCUMENTS

| | | | | |
|---|---|---|---|---|
| 5,628,031 | A | 5/1997 | Kikinis et al. | 710/73 |
| 5,638,093 | A | 6/1997 | Takahashi et al. | 345/173 |
| 5,691,959 | A | 11/1997 | Kriewall et al. | 178/18.04 |
| 5,717,432 | A | 2/1998 | Miwa et al. | 345/173 |
| 5,856,820 | A | 1/1999 | Weigers et al. | 345/177 |
| 5,986,224 | A | 11/1999 | Kent | 178/18.04 |
| 6,161,434 | A | 12/2000 | Fink et al. | 73/587 |
| 6,167,165 | A | 12/2000 | Gallagher et al. | 382/263 |
| 6,404,353 | B1 | 6/2002 | Coni et al. | 341/33 |
| 6,549,193 | B1 | 4/2003 | Huang et al. | 345/173 |
| 6,555,235 | B1 | 4/2003 | Aufderheide et al. | 428/447 |
| 6,724,373 | B1 | 4/2004 | O'Neill, Jr. et al. | 345/179 |
| 6,738,051 | B2 | 5/2004 | Boyd et al. | 345/176 |
| 6,891,527 | B1 * | 5/2005 | Chapman et al. | 345/158 |
| 6,922,642 | B2 * | 7/2005 | Sullivan | 702/56 |
| 7,049,960 | B2 * | 5/2006 | Waltermann | 340/568.1 |
| 7,116,315 | B2 * | 10/2006 | Sharp et al. | 345/177 |
| 2001/0006006 | A1 | 7/2001 | Hill | 178/18.04 |
| 2003/0066692 | A1 | 4/2003 | Devige et al. | 345/173 |
| 2003/0164820 | A1 | 9/2003 | Kent | 345/177 |
| 2003/0217873 | A1 | 11/2003 | Paradiso et al. | 178/18.04 |

FOREIGN PATENT DOCUMENTS

| | | |
|---|---|---|
| FR | 86 04296 | 3/1986 |
| FR | 2811107 | 1/2002 |
| GB | 2301217 A | 11/1996 |
| GB | 238 5125 A | 8/2003 |
| WO | WO 01/48684 A2 | 7/2001 |
| WO | WO 03/005292 A1 | 1/2003 |
| WO | WO 03/067511 A2 | 2/2003 |
| WO | WO 03/067511 A | 8/2003 |

OTHER PUBLICATIONS

Ing, R.K., et al., 2001, "Dynamic Focusing Using a Unique Transducer and Time Reversal Process," The 8th International Congress on Sound and Vibration, Jul. 2-6, 2001, Hong Kong, China, 8 pp.

Ing, R.K., et al., 1998, "Time-Reversed Lamb Waves," IEEE Transactions on Ultrasonics, Ferroelectrics, and Frequency Control, vol. 45, pp. 1032-1043.

Ing, R.K., et al., 2001, "Ultrasonic Imaging Using Spatio-Temporal Matched Field (STMF) Processing—Applications to Liquid and Solid Waveguides," IEEE Transactions on Ultrasonics, Ferroelectrics, and Frequency Control, vol. 48, pp. 374-386.

McLaughlin, E.A., and J. Arvelo, Co-Charimen, May 2004, "Engineering Acoustics: Computational Acoustics, Ultrasonics and Applications," Jour. Acoust. Soc. Am., vol. 115, pp. 2587-2589, in particular, Abstract 5aEA9, "Time reversal interactive objects," by Ing et al.

Quieffin, N., et al., Mar. 2004, "Real time beam steering using a one channel time reversal mirror coupled to a solid cavity," 2 pp.

Quieffin, N., et al., May 2004, "Real-time focusing using an ultrasonic one channel time-reversal mirror coupled to a solid cavity," Jour. Acoust. Soc. Am., vol. 115, 6 pp.

Wilson, P.S., and E. Viverios, Co-Chairmen, Dec. 2002, "Physical Acoustics: General Linear Acoustics," Jour. Acoust. Soc. Am., vol. 112, pp. 2413-2415, in particular, Abstract 5aPA3, "Real time focusing using an ultrasonic 'one channel time-reversal mirror' coupled to a solid structure," by Quieffin et al. and Abstract 5aPA4, "Harmonic generation of Lamb waves," by R. K. Ing.

Draeger et al., 1999, "One-channel time-reversal in chaotic cavities: Experimental results," J. Acoust. Soc. AM 105 (2): 618-625.

Ing, et al., 2001, "Dynamic Focusing Using a Unique Transducer and Time Reversal Process," The 8th International Congress on Sound and Vibration, Jul. 2-6, 2001, Hong Kong, China, 18 pp, PowerPoint Presentation.

Kim et al., 2004, "Echo-to-reverberation enhancement using a time reversal mirror," J. Acoust. Soc. Am 115 (4): 1525-1531.

* cited by examiner

FIG. 5
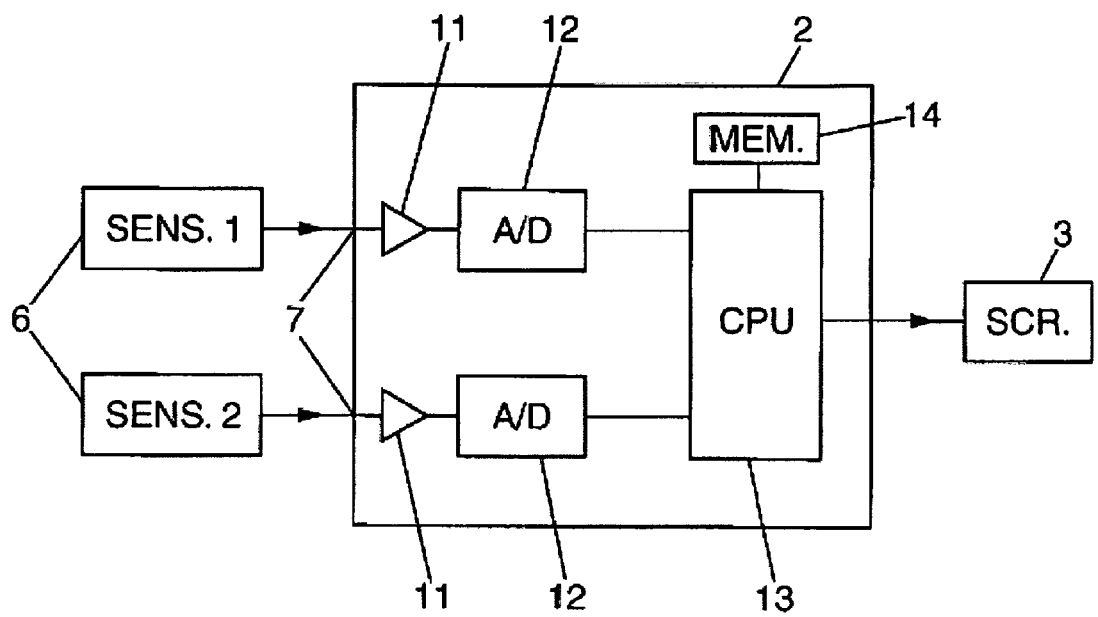
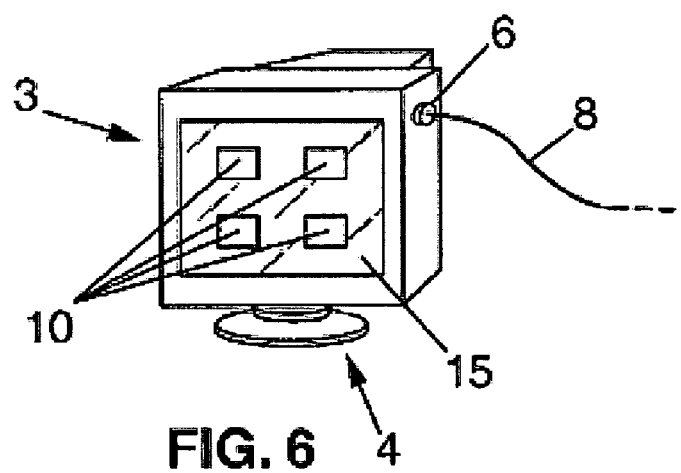
FIG. 6

METHOD FOR LOCATING AN IMPACT ON A SURFACE AND DEVICE THEREFOR

CROSS REFERENCE TO RELATED APPLICATIONS

This application is a continuation-in-part of U.S. patent application Ser. No. 10/518,152, filed Dec. 9, 2004 entitled "Method for Locating an Impact on a Surface and Device Therefor," which, in turn, claims priority to International Patent Application No. PCT/FR03/01769, filed Jun. 12, 2003, and published as WO 03/107261 A2, which, in turn, claims priority to French patent No. FR2841022, filed Jun. 12, 2002, each of which is hereby incorporated by reference in its entirety.

BACKGROUND OF THE INVENTION a) Field of the Invention

The present invention relates to the methods for locating an impact on a surface and to the devices for implementing those methods.

b) State of the Art

More particularly, the invention concerns a method for locating an impact on a surface forming part of an object forming an acoustic interface, provided with at least one acoustic sensor (the object forming an acoustic interface may be made of a single piece or of several elements, assembled or at least in mutual contact), a method in which at least one signal is sensed from acoustic waves generated in the object forming an acoustic interface by said impact and the impact is located by processing of said sensed signal.

The document FR-A-2 811 107 describes an example of such a method that applies in particular to a pane. In this known method, the position of the impact on the surface of the object is computed by measuring the differences in time for the acoustic waves to fly to different sensors.

This known method however requires:
that the pane used have a perfect homogeneity and a perfect surface state,
that the fields of the pane be specially treated, particularly to avoid reflections of the acoustic waves,
that the speed of the acoustic waves in the pane be known in advance, which assumes a precise knowledge of its composition,
that at least four sensors be used.

As a result, this known method is particularly costly to implement and cannot be applied to any preexisting objects, particularly heterogeneous objects consisting of assemblies of pieces, irregular shaped objects, etc.

The aim of the present invention is in particular to alleviate these disadvantages.

SUMMARY OF THE INVENTION

For this purpose, according to the invention, a method of the type in question is characterized in that it comprises a recognition step during which the sensed signal is compared with at least one predetermined signal corresponding to the signal that is sensed when an impact is generated on at least one active zone forming part of the surface of the object forming an acoustic interface (this comparison, which can be made both in the temporal domain and the frequency domain, may where appropriate be made on only one portion of the sensed signal or on data extracted from this sensed signal after processing, in which case said predetermined signal may be reduced to the portion on which the comparison is made or to the data on which the comparison is made), and the impact is associated with said active zone if the sensed signal is sufficiently similar to said predetermined signal.

Thanks to these arrangements, a method of locating an impact is obtained which is robust, adaptable to all objects (including heterogeneous objects consisting of assembly of several pieces or of placing several pieces in contact), easy and cheap to apply.

In preferred embodiments of the invention, one and/or other of the following arrangements may also be used where appropriate:

the surface of the object forming an acoustic interface comprises several active zones and, during the recognition step, the sensed signal is compared with several predetermined signals each corresponding to the sensed signal when an impact is generated on one of the active zones;

a single acoustic sensor is used;

several acoustic sensors are used and, during the recognition step, one signal is sensed for each acoustic sensor and the signals sensed by the various acoustic sensors are compared with the predetermined signals independently of one another;

the signals sensed by the various acoustic sensors are compared with the predetermined signals differently from one another;

several acoustic sensors are used measuring several different magnitudes;

at most two acoustic sensors are used;

the method comprises an initial learning step during which each predetermined signal is determined experimentally by generating at least one impact on each active zone;

each predetermined signal is a theoretical signal (computed or determined experimentally on an object identical or very similar from the acoustic point of view to the one used);

during the recognition step, the sensed signal is compared with the at least one predetermined signal by intercorrelation;

during the recognition step, the sensed signal is compared with the at least one predetermined signal by a recognition method chosen from voice recognition, signal recognition, shape recognition and recognition by neural network;

during the recognition step, the sensed signal is associated either with a single active zone, or with no active zone;

each active zone is associated with a predetermined information element (for example, an alphanumeric character, a command, etc.) and, when the impact is associated with an active zone, an electronic device is made to use the predetermined information element corresponding to that active zone;

the surface of the object forming an acoustic interface comprises a number n of active zones, n being at least equal to 2, and the recognition step comprises the following sub-steps:

an intercorrelation is made between the sensed signal $S(t)$ (generally after normalization) and the predetermined signals $R_i(t)$, i being a natural integer lying between 1 and n which designates an active zone, and intercorrelation functions $C_i(t)$ are thus obtained, a potentially activated active zone j is determined which corresponds to the result of intercorrelation $C_j(t)$ having a maximum amplitude greater than those of the other results $C_i(t)$, the distribution $D(i)$ of the amplitude maxima of the intercorrelation results is also determined:

$D(i)=\text{Max}((Ci(t))$, the distribution D'(i) of the amplitude maxima of the inter-correlation results C'i(t) between Rj(t) and the various predetermined signals Ri(t) is also determined:

$D'(i)=\text{Max}((C'i(t))$, a determination is made as to whether the impact was generated on the active zone j as a function of a level of correlation between the distributions D(i) and D'(i);

during the recognition step, the sensed signal is processed in order to extract therefrom the data representative of certain characteristics of the sensed signal and the data thus extracted is compared with reference data extracted from the signal that is sensed when an impact is generated on each active zone;

during the recognition step, a code is determined from the data extracted from the sensed signal and this code is compared with a table which gives a correspondence between at least certain codes and each active zone;

the object forming an acoustic interface comprises at least two active zones and, during the recognition step, the resemblance values representative of the resemblance between the sensed signal and the predetermined signals are determined (especially a value derived from the intercorrelation function, for example its maximum), the impact is associated with several adjacent active zones corresponding to a maximum resemblance, called reference active zones, then, the position of the impact on the surface is determined as a function of the resemblance values attributed to the reference active zones;

the position of the impact on the surface is determined such that the resemblance values attributed to the reference active zones correspond as well as possible to theoretical resemblance values computed for said reference active zones for an impact generated in said position on the surface;

the theoretical resemblance values are a function of the position of the impact on the surface, determined in advance for each possible set of reference active zones;

the active zone is identified by comparison between the phase of the predetermined signals Ri(t) and of the sensed signal;

during the learning phase, a computation is made of the Fourier transform $R_i(\omega)=|Ri(\omega)|\cdot e^{j\phi i(\omega)}$ of each acoustic signal $R_i(t)$ generated by an impact on the active zone i, where i is an index lying between 1 and n, and from this Fourier transform only the phase component $e^{j\phi i(\omega)}$ is retained, only in the frequency bands ω in which the amplitude $|Ri(\omega)|$ is greater than a predetermined threshold, then the same process is applied to each sensed acoustic signal S(t) during the normal operation of the device;

the predetermined threshold is equal to the maximum of MAX/D and $|B(\omega)|$, where:

MAX is chosen from the maximal value of the modules $|R_i(\omega)|$, the maximal value of the modules $|R_i(\omega)|$ each normalized in energy, and the maximal value of the envelope of the average of the modules $|R_i(\omega)|$ each normalized in energy, D is a constant, $|B(\omega)|$ is the average of several noise spectra in the object forming an acoustic interface, acquired at different times;

during the normal operation of the device:

a product $P_i(\omega)$ is computed equal to $S'(\omega)$ multiplied by the conjugate of $R_i'(\omega)$ for references i=1 . . . n, then the products $P_i(\omega)$ are normalized, then the inverse Fourier transform of all the products $P_i(\omega)$ is carried out and temporal functions $X_i(t)$ are obtained, and the signal S(t) is attributed to an active zone (10) as a function of said temporal functions $X_i(t)$;

the signal S(t) is attributed to an active zone as a function of the maximal values of said temporal functions $X_i(t)$.

Furthermore, another aim of the invention is a device especially adapted to implement an interfacing method as defined above.

Other features and advantages of the invention will emerge from the following description of five of its embodiments, given as nonlimiting examples, with respect to the attached drawings.

BRIEF DESCRIPTION OF THE DRAWINGS

In the drawings:

FIG. 5 is a block diagram of an exemplary device that can use the input interface of FIG. 4, FIGS. 6 to 9 depict schematically acoustic interfaces that can be used in a device for implementing a method according to third, fourth and fifth embodiments of the invention.

DESCRIPTION OF PREFERRED EMBODIMENTS

Figure 1:
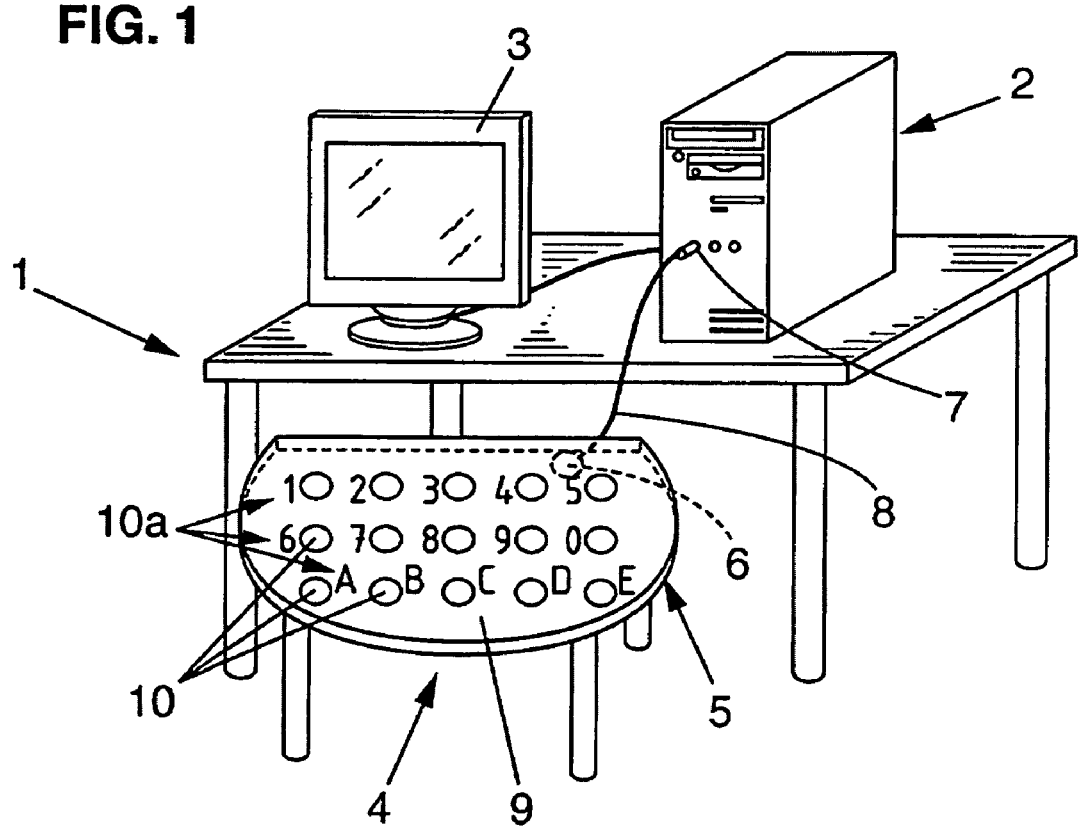
FIG. 1 is a schematic view in perspective showing an exemplary device comprising an acoustic interface adapted to implement a method according to a first embodiment of the invention.

FIG. 1 depicts a device 1 intended to implement the present invention, which comprises for example:

a microcomputer central processing unit 2 (e.g., one or more digital signal processors such as one or more application specific integrated circuits (ASICs), one or more field-programmable gate arrays (FPGAs), one or more general purpose microprocessors, or any combination thereof), a screen 3 connected to the central processing unit 2, and an acoustic input interface 4 which is used to communicate information to the central processing unit 2 in the example in question.

The acoustic input interface 4 comprises a solid object 5, consisting here of a table in which acoustic waves are propagated by generating impacts on its surface 9 as will be explained hereafter.

It will be noted however that the object forming an acoustic interface could consist of any other object, homogeneous or heterogeneous, made up of a single piece or of several pieces assembled or simply in mutual contact, such as: pane, door, window, a portable tray, computer screen, display panel, interactive terminal, toy, vehicle dashboard, rear of front seat back of automobile vehicle or of airplane seat, wall, floor, vehicle fenders (the information transmitted by the acoustic interface then being the position of an impact on the fenders), etc.

At least one acoustic sensor 6 (only one sensor 6 in the example shown) is attached to the object 5, this acoustic sensor 6 being connected for example to the microphone input 7 of the central processing unit 2, by means of a cable 8 or by any other means of transmission (radio, infrared or other), so as to sense said acoustic waves and transmit them to the central processing unit 2.

The acoustic sensor 6 may for example be a piezoelectric sensor or other (for example a capacitive sensor, a magnetostrictive sensor, an electromagnetic sensor, an acoustic velocimeter, an optical sensor [laser interferometer, laser vibrometer, etc.], a micro-electro-mechanical system (MEMS),etc.). It may be suitable for measuring, for example, the amplitude of the movements due to the propagation of the sound waves in the object 5 forming an acoustic interface, or the speed or acceleration of such movements, or it may involve a pressure sensor measuring the pressure variations due to the propagation of the acoustic waves in the object 5.

On the external surface 9 of the object 5 (in this instance on the upper face of the table forming said object 5 in the example shown in FIG. 1), several active zones 10 are defined which can be delimited for example:
- by a physical marking, removable or not, affixed to the surface 9 of the object 5,
- or by a luminous marking obtained by projecting an image onto the surface 9.

The surface 9 could also comprise portions in which the generation of an impact would be forbidden for example by covering them with a material that is flexible or simply inaccessible to the user, particularly for better reliability of the system.

The various active zones 10 may simply be portions of the surface 9, identical to the rest of the surface 9. These active zones are however differentiated from one another and from the rest of the surface 9 to the extent that an impact on one of the zones 10 generates an acoustic signal different from the signal generated by an impact on another of the active zones 10 or on another portion of the surface 9.

Each of the active zones 10 is associated with a predetermined information element that a user may wish to communicate to central processing unit 2. The information in question may for example be a command, a digit, a letter, a position on the surface 9, or any other information that can be habitually transmitted to an electronic device such as a microcomputer (or to the central processing unit of another electronic apparatus) by means of the conventional input interfaces such as keyboards, control buttons, mice or other.

The information in question may, where appropriate, be indicated in clear by the markings 10a on the surface 9 (as for the identifiers of the zones 10, these markings may be affixed physically to the surface 9 in a permanent or removable manner, or they may be projected in the form of luminous images onto said surface 9).

As a variant, the surface 9 of the object 5 may simply comprise identifiers (physically affixed or luminous) to distinguish the active zones from one another. These identifiers may for example be numbers or colors and a reminder of their meaning may where necessary be given by a display generated by the central processing unit 2 on the screen 3.

Where necessary, the surface 9 may also comprise no marking, either to delimit the active zones, or to identify the information to which they correspond, in which case the active zones 10 would be known only to the authorized users of the device 1.

It will be noted that the predetermined information elements associated with each active zone 10 may either be always the same or vary as a program runs in the central processing unit 2, or depend on previous actuations of other active zones 10 (certain active zones 10 may for example be actuated to change the function attributed to one or more active zone(s) 10 actuated after it, so as, for example, to access specific functions, special characters, or to put letters in upper case, etc.).

The various active zones 10 of the object 5 therefore constitute a true virtual keyboard that is actuated by hitting the active zones with a fingernail, with the fingertips, with an object such as a pen, stylet or other.

It will be noted that the surface 9 of the object 5 could, where appropriate, comprise a single active zone 10 in the simplest cases, this active zone 10 however not extending to the whole surface 9 and preferably constituting a small portion of said surface 9.

Figure 2:
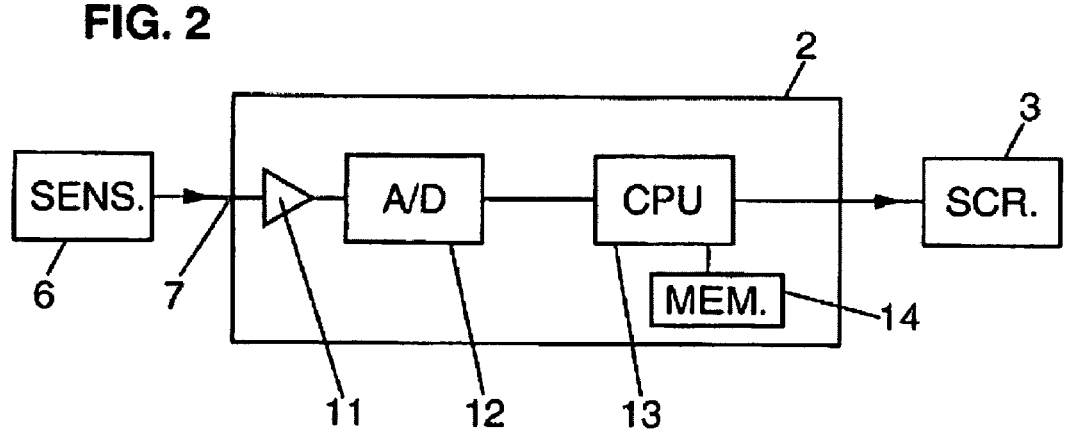
FIG. 2 is a block diagram of the device in FIG. 1.

As shown in FIG. 2, the sensor 6 (SENS.) may conventionally be connected via the input 7 to an amplifier 11 itself connected to an analog/digital converter 12 (A/D) which transmits the received signals to the processor 13 of the central processing unit 2 (CPU) which processor is in turn connected to one or more memories 14 (MEM.) and commands the abovementioned screen 3 (SCR.) or any other output interface sending information to the user.

It will be noted that the acoustic interface 4 could serve as an interface for inputting information to any electronic devices other than a microcomputer, for example a domestic or business electronic apparatus, a digicode, a vehicle electronic central processing unit, etc. In all cases, the electric signals generated by the sensor or sensors 6 may be processed either in this electronic apparatus or in an external digital signal processing device (DSP).

During the use of the device 1 described above, when a user generates an impact on the surface 9 of the object 5, this impact engenders an acoustic wave which is propagated in the object 5 to the acoustic sensor 6. The acoustic sensor 6 then generates an electric signal S(t) which, after digitization, is processed by the processor 13 (or by another dedicated processor, inside or outside the central processing unit 2).

The processor 13 then compares the received signal with the various predetermined signals belonging to a library of signals previously stored in the memory 14, these predetermined signals corresponding respectively to impacts generated on the different active zones 10 of the object 5.

This comparison is used to ascertain whether the acoustic signal originates from one of the active zones 10, and which, irrespective of the mode of excitation of said active surface (impact of a fingernail, of a fingertip, of the palm of a hand, of an object such as a pen or a stylet, etc.).

These predetermined signals from the library of signals may have been determined during an initial learning phase in which impacts are generated successively on all the active zones 10 of the object 5, by recording the corresponding signals (preferably after normalization, for example so that the energy of each reference signal is equal to 1) received in the central processing unit 2 via the acoustic sensor 6.

As a variant, when the object 5 has a simple and/or repetitive geometric shape, it is possible for the predetermined signals from the library of signals to be obtained by modeling or determined experimentally only once for all the objects 5 of a series of identical objects: in these two cases, there would therefore not be a prior learning phase for the particular object 5 connected to the central processing unit 2, but simply installation of the library of signals in the memory 14 of said central processing unit.

It will be noted that, in some cases (particularly if the object 5 is made of wood), the predetermined signals from the library of signals may be made to vary according to the ambient conditions, particularly the temperature and the humidity. These variations may be computed or be the result of a new learning phase.

The signals received during the use of the device 1 can be compared with the predetermined signals from the library of signals:
- directly on the temporal signals S(t) received from the sensor 6,
- or on the frequency spectrum of these signals (for example after Fourier transform of the temporal signals received from the sensor 6),
- or on other data characteristic of the signal, particularly its phase.

The sensed signals can be compared with the predetermined signals from the library of signals by any known means, in particular:
- by intercorrelation,
- by known methods of voice recognition, of signal recognition or of shape recognition,
- by the use of neural networks or others.

As a more precise example, the following method can in particular be used to recognize the active zone 10 from which the sensed signal S(t) comes:

(1) after normalization of the sensed signal S(t) (for example S(t) is calibrated so that its energy is equal to 1), the signal S(t) generated by the sensor 6 is intercorrelated with the n predetermined signals also normalized from the library, denoted $R_i(t)$ where i=1 ... n. Functions $C_i(t)$ are thus obtained that are the temporal results of the product of intercorrelation of the signal S(t) respectively with the signals $R_i(t)$ from the library. Based on these computations is determined a potentially activated active zone j corresponds to the result of intercorrelation $C_j(t)$ having a maximum amplitude greater than those of the other results $C_i(t)$.

(2) The distribution D(i) of the amplitude maxima of the intercorrelation results is also determined:

$$D(i) = \text{Max}((C_i(t))) \text{ where } i=1 \ldots n.$$

(3) A second distribution function D'(i), obtained in the same manner as the computation of the function D(i) but replacing S(t) with $R_j(t)$, is computed.

(4) An intercorrelation is carried out of the distributions of the amplitude maxima D(i) and D'(i). If the maximal amplitude E of the result of intercorrelation between D(i) and D'(i) is sufficient, then j is the considered number of the activated zone. Otherwise, the signal generated by the sensor corresponds to a false alarm.

Figure 3:
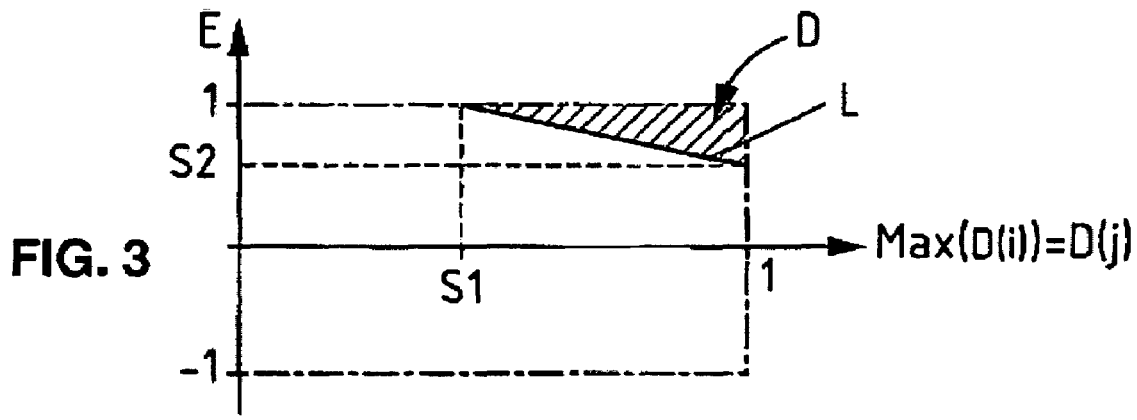
FIG. 3 depicts a graph illustrating an exemplary method used to associate an impact on the surface of the acoustic interface visible in FIG. 1, with an active zone of that surface.

During this step (4), E and the maximal value of D(i), or Max(D(i)) can simply be computed: if these two values are considered to be the coordinates of a point in a two-dimensional space of axes x=Max(D(i)) and y=E, as shown in FIG. 3, a curve threshold L can be determined in advance (empirically or by computation) which delimits a domain D corresponding to the validated points (this domain is finite and limited at x=1 and y=1, absolute maximal values of D(i) and E). The sensed signals which give points outside the domain D, for their part, are eliminated as being false alarms.

In the example in question, the line D is a straight line which can pass for example through the points (S1, 0) and (0, S2). For example, S1=0.4 and S2=0.4 or 0.6.

It will be noted that in addition to identifying the active zone 10 from which the impact comes, it would be possible to measure the force of the impact, for example in order to guide the user in how to use the acoustic interface, or to modulate the action triggered by an impact on an active zone 10, according to the intensity of that impact.

It will be noted furthermore that the signals originating from the active zones 10 may, where necessary, be recognized by using only a portion of the received signals S(t) or a portion of their frequency spectrum or more generally a portion of their characteristics. In this case, during the recognition step, the sensed signal is processed in order to extract from it data representing certain characteristics of the sensed signal and the data thus extracted is compared with reference data extracted from the signal which is sensed when an impact is generated on each active zone.

Thus, it is for example possible to measure the amplitude and the phase of the signal for m predetermined frequencies (m being a natural integer at least equal to 1) and to compare these measured amplitudes a1-am and these measured phases p1-pn with the measured amplitudes Ai1-Aim and the measured phases Pi1-Pim at said predetermined frequencies based on signals received during the learning phase (or determined by modeling) for the various active zones 10 numbered i (i being between 1 and n, where n is the number of active zones 10).

As a variant, it is possible to determine a code from said data extracted from the sensed signal and to compare this code with a table which gives a correspondence between at least certain codes and each active zone (the codes contained in this table then represent the predetermined signals from the abovementioned library of signals).

As a nonlimiting example, a 16-bit code can be determined from the sensed signal S(t) in the following manner:
- the first 8 bits of the code are determined from the frequency spectrum of the signal S(t) that is subdivided into 8 predetermined frequency tranches $[f_k, f_{k+1}]$, k=0 ... 7: the bit of rank k is equal to 1 for example if the final energy value given by the spectrum at frequency $f_{k+1}$ is greater than the average energy value of the acoustic wave in the frequency tranches $[f_k, f_{k+1}]$ and this bit is 0 otherwise;
- the last 8 bits of the code are determined from the temporal signal S(t) that is subdivided into 9 predetermined temporal tranches $[t_k, t_{k+1}]$, k=0 ... 8: the bit of rank k+8 is equal to 1 for example if the average value of the signal power during the period $[t_k, t_{k+1}]$ is greater than the average value of the signal power during the period $[t_{k+1}, t_{k+2}]$, k=0 ... 7, and this bit is 0 otherwise.

In this particular example, the codes in the correspondence table would be determined during the learning phase, by computing as indicated above the codes that correspond to the signals sensed by the acoustic sensor 6 when impacts are generated on the different active zones 10.

Figure 4:
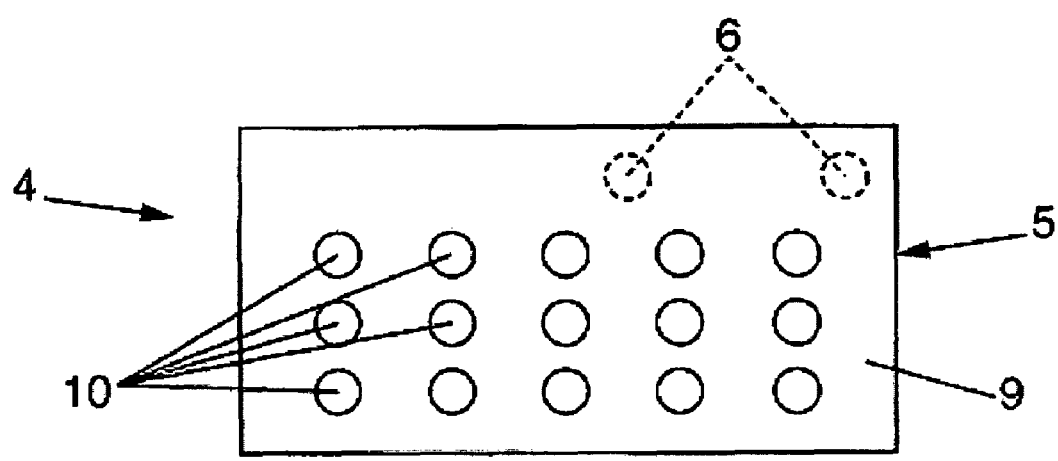
FIG. 4 depicts schematically an acoustic interface that can be used in a device for implementing a method according to a second embodiment of the invention.

Furthermore, as shown in FIGS. 4 and 5, it may be possible to use two acoustic sensors 6 (SENS.1 and SENS.2), particularly when the object 5 has symmetries such that there may be a risk of confusion between the signals originating from two different active zones 10. Where appropriate, more than two acoustic sensors 6 may be used, although the preferred solutions call for one or two sensors 6.

When two or more sensors are used, two choices are possible:
1) mixing of the signals of the various sensors and processing of the global signal according to the method described above,
2) or, preferably, individual processing of the signals of the various sensors with the method described above and a cross-checking of the results:

if the active zones 10 determined from the various sensors have identical numbers, then it is determined that the zone that received an impact is the latter, in the other cases, it is possible either to consider the sensed signal to be a false alarm or to determine the zone that received an impact for example by intercorrelation between the intercorrelation functions Ci(t) determined for each sensor or by more complex means such as neural networks or others.

It will be noted that the two acoustic sensors may be of different types and/or sense different magnitudes and/or their signals may be processed differently to identify the active zones 10 receiving impacts. For example, one of the acoustic sensors may be used to record the received signal S(t), while the other may be used only to determine a temporal difference between the arrival of the acoustic wave at the two sensors.

The second sensor might furthermore not sense the acoustic wave propagated in the solid object 5, but the acoustic wave propagated in the air at the time of the impact.

As shown in FIG. 6, the object forming an acoustic interface may consist of the computer screen 3 or a television screen to which the sensor 6 is attached. The surface receiving the impacts may advantageously be the pane 15 of the screen, which could in particular be used to have the screen 3 display the delimitation of the active zones 10 and their meaning. This variant could be used for example to program a video cassette recorder, particularly when the screen 3 is a television screen (the central processing unit 2 would then be replaced by the video cassette recorder).

Figure 7:
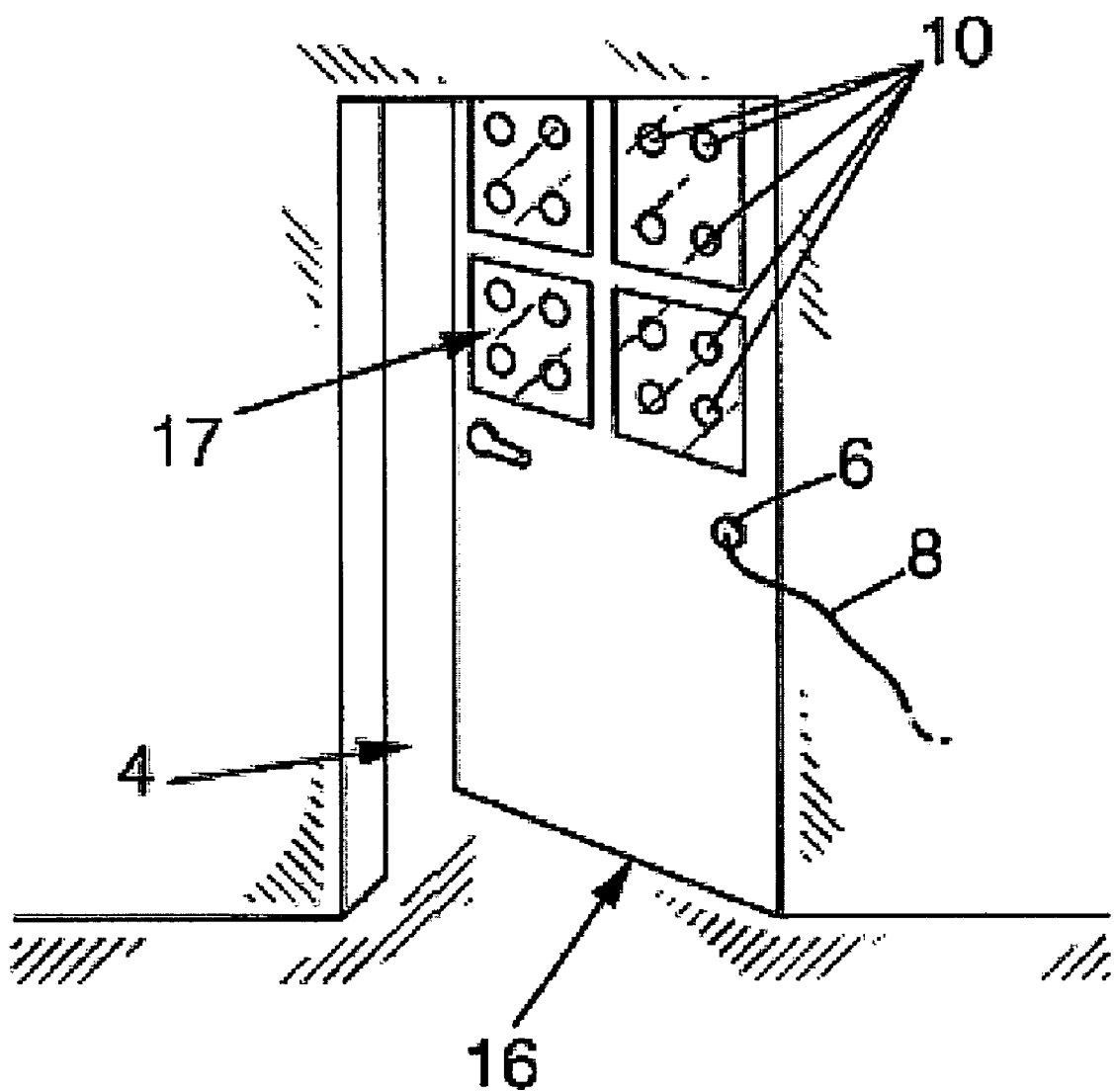

As shown in FIG. 7, the object forming an acoustic interface may also consist of a glass paneled door 16 or similar. In the example shown in FIG. 7, the surface 17 which supports the active zones 10 consists of the glazed surface of the door, and, still in the particular example shown in this figure, the acoustic sensor 6 is attached to a wooden portion of the door 16.

Figure 8:
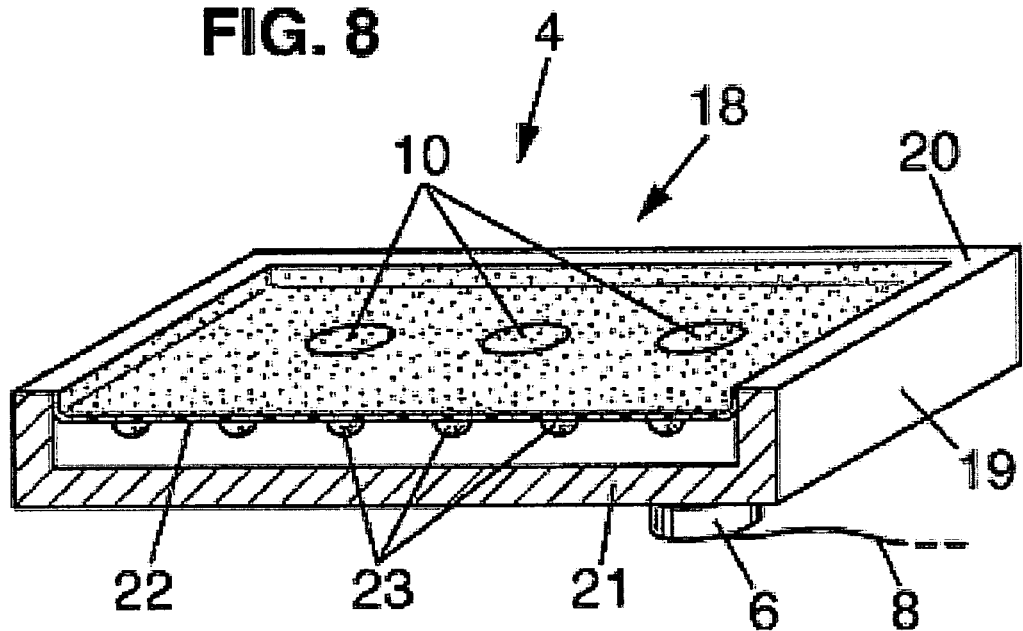

In the example shown in FIG. 8, the object forming an acoustic interface is a tray 18 designed especially to serve as an acoustic interface. This tray may for example comprise a rigid frame 19 secured to a base 20, also rigid, which supports the acoustic sensor 6.

A flexible membrane 22, made for example of elastomer, is stretched over the frame 19 a short distance above the base 21. This flexible membrane 22 is provided with rigid protrusions 23 under its bottom face (these may for example be glass hemispheres that are bonded beneath the membrane 22). Thus, when a user taps on the membrane 22 and particularly on an active zone 10 supported by this membrane, this action generates an impact of at least one protrusion 23 on the bottom 21 of the frame of the tray 18. This variant has the advantage of producing impacts that are less dependent on the manner in which the user taps on the membrane 22 (with the finger or the nail or a tool, with more or less force, etc.).

In the embodiments in FIGS. 6 to 8, the method implemented may be identical or similar to that described previously and may be used to provide a correspondence of an impact generated on the surface of the object forming an acoustic interface either with an active zone 10 or with no active zone.

Figure 9:
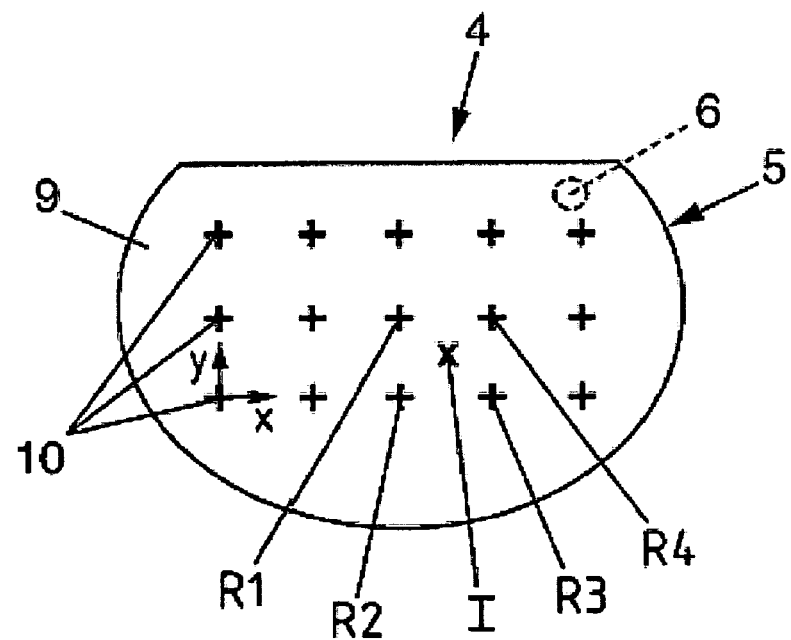

But it is also possible, in all the embodiments of the invention using several active surfaces (point-like where necessary), to determine the position of the impact on the surface 9 of the object 5 forming an acoustic interface (see the example in FIG. 9), even when that impact is not on one of the active zones. A continuous or pseudo continuous acoustic interface is thus obtained (making possible an operation similar for example to a computer mouse, to a light pen, to a touch-sensitive screen or similar).

In this case, during the recognition step:

resemblance values representative of the resemblance between the sensed signal and the predetermined signals are determined (particularly values originating from the abovementioned intercorrelation functions Ci(t), for example their maxima D(i) defined above), the impact is associated with a number p at least equal to 2 of adjacent active zones corresponding to a maximum resemblance, called reference active zones R1-R4 (p may advantageously be 4 particularly for positioning the impact according to two dimensions x, y, or where appropriate less than 4 particularly if the impact is to be positioned only according to a single dimension x or y): for example, the zone R1 can first be determined as being the active zone 10 having the maximal resemblance value D(i), and then, from the active zones adjacent to R1, the three zones R2-R4 can be determined which give the highest values of the resemblance value D(i));

then the position of the impact I on the surface 9 is determined as a function of the resemblance values D(i) attributed to the reference active zones R1-R4.

During this last step, advantageously it is possible to determine the position of the impact on the surface such that the resemblance values attributed to the reference active zones correspond as well as possible to theoretical resemblance values computed for said reference active zones for an impact generated in said position on the surface.

These theoretical resemblance values may in particular be functions of the position of the impact on the surface, determined in advance for each possible set of reference active zones.

The functions in question may be determined during the learning step, for example by adjusting a typical function on the values of resemblance between the active zones. The typical function in question may depend on the shape of the object and be determined in advance, either theoretically or experimentally.

To take a practical example, the function of theoretical resemblance Rth(X, Y) between two points X, Y of the surface 9 may correspond to the maximum of the function of intercorrelation between the signals Sx(t) and Sy(t) sensed by the sensor 6 respectively when impacts are generated at these two points X, Y, and this function may for example be of the type Rth(X, Y)=(sin(a($\beta$).d))/(a($\beta$).d), approximated for example by Rth(X, Y)=1−[a($\beta$).d]$^2$/6, where:

d is the distance between X and Y, $\beta$ is an angle between for example the x axis (or y axis) and the direction X-Y, and a($\beta$) is a coefficient dependent on the angle $\beta$ according to an elliptical function:

$$a(\beta)=a1\cdot\cos(\beta+\beta 0)+a2\cdot\sin((\beta+\beta 0),$$

where $\beta 0$ is an angle representative of the orientation of the ellipse.

The Rth function can be determined for each possible set of active reference zones R1-R4, from predetermined signals Ri(t) from the library of signals, sensed by generating impacts respectively on the reference active zones during the learning phase.

Accordingly, for a given set of four reference zones R1-R4, the maximum intercorrelation function of the signal R1(t) corresponding to R1 can be computed, with each of the signals R2(t), R3(t), R4(t) corresponding to the zones R2-R4. From this are deduced the values of a1, a2 and β0. The same process can then be performed from the reference zones R2, R3 and R4, which on each occasion gives the values of a1, a2 and β0, then the average of the four values thus found respectively for a1, a2 and β0 can be averaged: these averaged values then determine the function Rth for all the reference zones R1-R4. As a variant, the function Rth could be determined by an iterative optimization process (of the least squares method type) to minimize a function of error between the function of theoretical resemblance and the maxima of the functions of intercorrelation between the signals R1(t), R2(t), R3(t) and R4(t) taken two at a time.

When the abovementioned theoretical resemblance functions Rth have been determined, when seeking to determine the position of an impact I between four adjacent active zones R1-R4 (advantageously point-like), this position can for example be determined by an iterative optimization process by minimizing a function of error between the values D(i) previously defined (D(i)=Max(Ci(t)), with i here being the number of the reference active zone R1 in question) and the values of theoretical resemblance Rth(I, R1). For example, a function of error E equal to the sum of the values $(D(i)-Rth(I, Ri))^2$ can be minimized.

The method that has just been described is of course not limited to the examples that have just been described; it has many applications, amongst which:
- the use of panes or other surfaces as an input interface 4, in shops, museums, art galleries, or other places to allow the clients or the visitors to display details on a screen or via a loudspeaker concerning the products or works exhibited,
- the use of panes or other surfaces of display panels as input interfaces 4, allowing passers-by to display for example details on the publicity items being displayed, or to display general information concerning a community or another place (for example news or practical information, for example a plan of the location), or other, these details or information being displayed for example on a screen visible in the lower portion of the display panel,
- the use of portions of walls, of the ground, or of any other object as an input interface 4 for example for controlling home automation systems (residents of an apartment can thus in particular themselves determine the positions of the switches, consisting simply of the abovementioned active zones 10, positioned on the walls or other places as required),
- the use of portions of walls, of the ground, or of any other object as an input interface 4 for example for controlling industrial machines particularly in dangerous environments (places containing explosives, places with high temperature, places with high radioactivity, etc.),
- the use of smooth and easily maintained surfaces as an input interface 4, in order to constitute input keyboards of domestic objects such as refrigerators, washing machines or other,
- the use of panels on building doors as input interfaces 4, forming for example virtual digicode keyboards,
- the use of the ground to locate the position of a person walking on it,
- the production of keyboards or control panels unaffected by pollution, bad weather or other external attacks, in industrial, military or even domestic applications (the acoustic sensor or sensors may where necessary be fully integrated into the object serving as the input interface, in particular if it is an object at least partially molded in plastic material); when these input interfaces are to control a device (for example a microcomputer), comprising a display screen, the keyboard or acoustic control panel may consist of the screen itself or a transparent surface covering that screen,
- the production of input interfaces in automobiles or other vehicles.

It will furthermore be noted that the previously described input interface 4 could be provided with processing means for locally performing the recognition of acoustic signals S(t) originating from the active zones 10, the input interface 4 then sending directly to the central processing unit 2, or to any other user electronic apparatus, only coded signals indicating directly which active zone 10 has been touched by the user and, where appropriate, information relating to the impact: force of the impact and nature of the impact.

It will be noted that the method according to the invention does not require the object 5 to have a homogeneous or predetermined structure, or be made with a particular care, or be made with very precise dimensions, or with specific surface states. On the contrary, the more the object 5 is heterogeneous and/or irregular, the more the acoustic signals emitted by the different active zones 10 will be different from one another and the better the acoustic signals will be recognized. In certain cases, heterogeneities can even be intentionally created such as cavities or others in the object 5 to facilitate recognition of the acoustic signals originating from the active zones 10.

Furthermore, when the predetermined signals from the library of signals are determined during a learning phase, it is possible to use a piezoelectric sensor connected by any known means to a central processing unit 2 and fixed either to the finger of the user, or to the object (stylet or other) used to generate impacts on the active zones of the object 5. In this case, the impulse signal generated by the piezoelectric sensor at the time of each impact can be used to trigger the acquisition of the predetermined acoustic signal intended to feed the library of signals, and/or can be used to measure the intensity of the impact, this measurement of intensity being able to be used for example to invalidate certain acquisitions of predetermined signals in particular when the intensity is below a predetermined threshold or when this intensity does not fall within a predefined period.

Furthermore, when the predetermined signals from the library of signals are determined during a learning phase, it may be advantageous to retain only the sensed acoustic signals whose amplitude is greater than a relatively high first reference threshold. In this case, during the normal operation of the device, account can thereafter be taken of the acoustic signals whose amplitude exceeds a second predetermined threshold clearly lower than the first threshold. The first predetermined threshold may thus be equal to several times (at least two to three times) the average temporal value of the absolute amplitude of the ambient noise, measured for example over several seconds, whereas the second predetermined threshold may for example be equal to 1.5 times that average value. In this manner, only good quality reference signals are recorded during the learning phase, while retaining a great sensitivity of the device during its normal operation.

Where appropriate, the central processing unit 2 may be provided with an auxiliary programming keyboard (not shown) which may be used in particular during the learning phase to indicate for example what type of signal is generated. This type of generated signal may in particular be one of the following types:
- new signal replacing one of the reference signals from the library of signals (the identification of the replaced reference signal may thus be communicated to the central processing unit 2 by means of the auxiliary keyboard), new reference signal (either for a preexisting but incomplete reference library, or for a new reference library corresponding in particular to new conditions of temperature, humidity or state of the object 5), new signal intended to verify a reference signal that already exists in a library of signals.

Furthermore, when the predetermined signals from the library of signals are determined during a learning phase, provision may be made where appropriate to validate the reference signals from that library only when they are confirmed by generation of one or more impact(s) on the same active zone, within a predetermined elapsed time following the generation of a first impact.

When the predetermined signals from the library of signals are determined during a learning phase, the impacts generated on the object 5 during this learning phase may be generated:

either with a hard object such as a stylet, in which case the same stylet will preferably be used during the normal operation of the device, or with a more shock-absorbent object such as for example a hard plastic rubber attached to the end of a pen or similar (the inventors have thus been able to obtain good results with a "Staedler" brand of hard plastic rubber for transparencies), in which case the impacts on the object 5 may then be generated just as well with relatively hard objects as with less hard objects (fingernail, finger pad or other) during the normal operation of the device.

Furthermore, as a variant of the method previously described to recognize the active zone 10 from which the sensed signal S(t) comes, it is possible to use the following method:

(1) during the learning phase, the Fourier transform $R_i(\omega)$ is computed for each acoustic signal $R_i(t)$ generated by an impact on the active zone i, where i is an index lying between 1 and n:

$$R_i(\omega) = |R_i(\omega)| \cdot e^{j\phi i(\omega)}$$

From this Fourier transform, only the phase component is retained, only in the frequency bands $\omega$ in which the amplitude of the spectrum is greater than a predetermined threshold.

The frequency shape of the reference signal retained is therefore expressed in the form $R'_i(\omega) = e^{j\phi i(\omega)}$ for the frequencies $\omega$ at which $|R_i(\omega)|$ is greater than the predetermined threshold and $R'_i(\omega) = 0$ at the other frequencies $\omega$.

The predetermined threshold in question may for example be equal to the maximum of MAX/D and of $|B(\omega)|$, where:

MAX may be either the maximal value of $|R_i(\omega)|$, or the maximal value of the modules $|R_i(\omega)|$ each normalized in energy, or the maximal value of the envelope of the average of the modules $|R_i(\omega)|$ each normalized in energy, D is a constant, for example equal to 100, $|B(\omega)|$ is the average of several noise spectra in the object 5, acquired at different times.

(2) During the normal operation of the device, each sensed signal S(t) undergoes the same process as in step (1) above, such that a signal $S'(\omega) = e^{j\psi(\omega)}$ is obtained for the frequencies $\omega$ at which $|S(\omega)|$ is greater than the abovementioned predetermined threshold, $S'(\omega)$ being equal to 0 at the other frequencies.

(3) Then a product $Pi(\omega)$ is computed equal to $S'(\omega)$ multiplied by the conjugate of $R'(\omega)$ for i=1 . . . n.

(4) The products $P_i(\omega)$ are normalized by dividing them by their integrals.

(5) Then the inverse Fourier transform of all the products $P_i(\omega)$ is carried out and temporal functions $X_i(t)$ are obtained.

According to the different functions $X_i(t)$, and particularly according to their maximum, the signal S(t) can then be attributed to one of the active zones 10. As an example, the maximal value (as a relative value or absolute value) can be computed of the different functions $X_i(t)$ and the signal S(t) can be attributed to the active zone i which corresponds to the function $X_i(t)$ with the greatest maximum. Where necessary, the maximum of the function $X_i(t)$ retained can also be compared with a threshold defined in advance, for example equal to 0.6, and it can be decided that the signal S(t) should be attributed to the zone i when the maximum of $X_i(t)$ is greater than this threshold (if several functions $X_i(t)$ have their maximum greater than 0.6, only the function $X_i(t)$ with the greatest maximum is then retained).

It is possible where necessary to verify that the attribution of the signal S(t) to the active zone i is correct, for example by computing a value $MM_i = M_i/M$ where $M_i$ is the maximum of the absolute value of $X_i(t)$ and M is the average value of all the values $M_i$. The attribution of the signal S(t) to the active zone i may then be considered to be correct if that value $MM_i$ is greater than a certain limit, equal for example to 1.414.

It will also be noted that the abovementioned values $MM_i$ may be computed by replacing $S'(\omega)$ with $R'_i(\omega)$, in order to obtain information on the spatial resolution of the active zones. In particular, it can thus be verified that an active zone with index i does not risk being confused with another, by verifying that the corresponding value $MM_i$ is greater than a predetermined limit, for example greater than 1.414.

Furthermore, it is also possible to take account of different environmental parameters (temperature, relative humidity, mechanical stresses, etc.) by modifying the predetermined signals from the library of signals as a function of the environmental parameter or parameters.

Accordingly, use can be made of one of the following correction methods:

linear temporal dilation or contraction of the reference signals from the library of signals: in this case, the reference signals $R_i(t)$ from the library of signals are replaced by signals $R_i(\alpha t)$, where $\alpha$ is a non null positive multiplier coefficient which is a function of the environmental parameters, this coefficient $\alpha$ being able to be determined theoretically or experimentally for a given material, or experimentally for each object 5;

linear temporal dilation or contraction of the sensed signals S(t): in this case, the reference signals $R_i(t)$ are left unchanged, but the sensed signal S(t) is replaced by $S(\alpha t)$ where $\alpha$ is a coefficient as defined above;

nonlinear dilation or contraction in frequency of the reference signals: in this case, the frequency signals $R'_i(\omega)$ are replaced by $R'_i(\omega')$, with $$\omega' = \frac{\omega \beta^2}{1 + \sqrt{(\omega/\omega_N) \cdot (\beta - 1)}},$$

where $\omega_N$ is equal to half the sampling frequency of the processing device, and $\beta$ is a coefficient determined theoretically or experimentally;

nonlinear dilation or contraction in frequency of the sensed signal S(t): in this case, the reference signals from the library of signals are left unchanged, and the signal $S'(\omega)$ is replaced by $S'(\omega')$, $\omega'$ being defined above.

In the two abovementioned cases of nonlinear dilation or contraction in frequency, it is possible also to use an averaged correction of phase, in which case the signals $R_i(\omega')$ are replaced by $R_i(\omega')$. $M'(\omega)/N'(\omega)$ or the signals $S(\omega')$ are replaced by $S(\omega')$. $M'(\omega)/N'(\omega)$. In one or other of these formulae, $N'(\omega)=M(\omega)/|M(\omega)|$, and $N'(\omega)=N(\omega)/|N(\omega)|$, $M(\omega)$ being equal to the average of all the $R_i(\omega)$ and $N(\omega)$ being equal to the average of all the $R_i(\omega')$.

The various abovementioned corrections of the reference signals $R_i(\omega)$ or of the sensed signal $S(\omega)$ may be made either automatically by the central processing unit 2, particularly as a function of information given by one or more sensors (not shown), or manually by the user.

Furthermore, it will be noted that the central processing unit 2 may comprise several libraries of reference signals suitable for different values of the environmental parameters.

Furthermore, to suit the types of impacts generated when the device is used, and particularly to suit the use either of a finger of the user, or of another object to generate the impacts, it may be advantageous to request the user to generate impacts on one or more predetermined active zones 10, for example two active zones of indices m and p. Thus two temporal signals $S_m(t)$ and $S_p(t)$ are sensed, their Fourier transforms $S_m(\omega)$ and $S_p(\omega)$ are computed and then the average $M_1(\omega)$ of the following two terms is computed:

$$(R_m(\omega) \cdot |S_m(\omega)|)/(|R_m(\omega)| \cdot S_m(\omega)),$$

and $(R_p(\omega) \cdot |S_p(\omega)|)/(|R_p(\omega)| \cdot S_p(\omega))$.

This average $M_1(\omega)$ is then used in step (3) previously defined to replace the product $P_i(\omega)$ with $M_1(\omega) \cdot P_i(\omega)$, this product then being used instead of $P_i(\omega)$ in step (4).

Furthermore, it will be noted that the invention allows a user to define active zones at will and the central processing unit 2 may be suitable for keeping active this definition of the active zones only when the object 5 is effectively being used as an acoustic interface. In this case, the abovementioned definition of the active zones is erased by the central processing unit 2 after a certain period of nonuse of the device.

It will also be noted that the function generated by an impact on an active zone may be modulated where appropriate as a function of the intensity of that impact.

It will also be noted that, when the object 5 exhibits resonance phenomena which cause prolonged propagations of acoustic waves on each impact on the active zones, it may be advantageous to raise the threshold of detection of the acoustic signals S(t) (for example up to 0.5 times the maximal value admissible by the electronic system for acquisition of the signal S(t)) when a signal S(t) has been detected, then to lower this detection threshold again (notably in exponential manner) to its normal level: thus, multiple detections of one and the same impact are avoided.

It will be noted that, in all the embodiments of the invention, it would where necessary be possible to define a single active zone on the object 5, in which case it is nevertheless possible to code several functions on that single active zone, for example according to the number of impacts generated consecutively on the same zone.

Furthermore, the active zones 10 may where necessary not be defined in advance, but simply be defined as a function of the successive impacts received during the use of the device. Thus, the device can for example be designed to comprise three active zones, which are each simply defined on the receipt of a first impact on each zone, and which are then recognized as "first zone", "second zone", and "third zone", on receipt of the subsequent impacts.

Furthermore, when the active zones are very numerous, use can be made where necessary of an automated device to generate the reference signals stored in the library of signals during the learning phase. This automated device could for example comprise a system of movement on two dimensions, comprising two step motors, to move for example an excitation stylet or similar to the surface of the object 5 and to generate impacts by means of this stylet, actuated for example by a solenoid, on the various active zones.

Still in the situation where the active zones 10 are extremely numerous, it may be possible to divide them into several resemblance groups. In this case, during normal use of the device, when an impact generates a signal S(t), a first process is used to attach this signal S(t) to one of the resemblance groups, then a refined process is used to assign this signal S(t) to one of the active zones in this resemblance group.

It will also be noted that the same central processing unit 2 could where necessary process the signals originating from several objects 5. In addition, it is also possible to interface the acoustic sensor or sensors directly with a network, particularly an IP network, in order to direct the sensed signals to a single IP address from which these signals can be exploited by any computer connected to the IP network.

Intercorrelation function. In the present invention, a sensed signal S(t) is compared with predetermined signals Ri(t), where i=1, . . . , n, from a library of predetermined signals by any known means, such as intercorrelation. In one example, the sensed signal S(t) and each of the predetermined signals Ri(t) are normalized. For example S(t) is calibrated so that its energy is equal to 1. Likewise, each of the predetermined signals is calibrated so that their respective energies are each equal to 1. Each predetermined signal corresponds to an active zone in a plurality of active zones on the surface or surfaces of the object.

For each i in the set 1, . . . , n, the sensed signal is intercorrelated with a function Ri(t) from the library to obtain the temporal intercorrelation functions Ci(t) where $$Ci(t) = \int_{-\infty}^{+\infty} S(t')Ri(t'-t)dt'.$$

Functions Ci(t) are thus obtained that are the temporal results of the product of intercorrelation of the signal S(t) respectively with the signals Ri(t) from the library. Based on these computations, the intercorrelation function Cj(t) having a maximum value (e.g., max[Cj(t)]) that is greater than the maximum value of any other intercorrelation function computed above, is identified. As noted above, each intercorrelation function Ci(t) is associated with an active zone. Therefore, identification of Cj(t) necessarily identifies a unique potentially active zone j.

To confirm the potentially active zone j, additional steps are taken in some embodiments. The distribution D(i) of the amplitude maxima of the intercorrelation results is determined:

$$D(i)=\mathrm{Max}(Ci(t)) \text{ where } i=1, \ldots, n.$$

For example, consider the case in which n=10. In, this case, D(i) will consist of ten discrete values. Such values for a hypothetical data set are:

| D (i) | Value |
| --- | --- |
| D (1) | 0.11 |
| D (2) | 0.08 |
| D (3) | 0.05 |
| D (4) | 0.12 |
| D (5) | 0.07 |
| D (6) | 0.01 |
| D (7) | 0.94 |
| D (8) | 0.11 |
| D (9) | 0.14 |
| D (10) | 0.05 |

In this example, each D(i) corresponds to a different active zone on the surface of the object. Furthermore, it can be seen that D(7) is larger than other values D(i). Thus, C7(t) is the intercorrelation function Cj(t) having a maximum value and the potentially active zone j in this example is active zone "7."

Further, the intercorrelation functions C'(t) functions are computed, where $$C'i(t) = \int_{-\infty}^{+\infty} R_j(t')Ri(t'-t)dt'.$$

Here, Rj(t') is the predetermined signal that yields the intercorrelation function Ci(t) having a maximal value. In this example, Rj(t') is the predetermined signal associated with the active zone "7." Thus, in this example, C'i(t) is:

$$Ci(t) = \int_{-\infty}^{+\infty} R7(t')Ri(t'-t)dt'.$$

The distribution D'(i) of the amplitude maxima of the intercorrelation results is also determined.

D'(i)=Max(C'i(t)) where i=1, . . . , n.

In the present example, D'(i) will consist of ten discrete values. Such values for a hypothetical data set are:

| D' (i) | Value |
| --- | --- |
| D' (1) | 0.12 |
| D' (2) | 0.07 |
| D' (3) | 0.06 |
| D' (4) | 0.13 |
| D' (5) | 0.05 |
| D' (6) | 0.03 |
| D' (7) | 1 |
| D' (8) | 0.15 |
| D' (9) | 0.13 |
| D' (10) | 0.07 |

It can be seen that D'(7) is larger than other values D'(i). Note that values D(i) and D'(i) range between 0 and 1 in this example. This is reflective of preferred embodiments of the present invention in which the values D(i) and D'(i) are normalized.

Next, the distributions of the amplitude maxima D(i) and D'(i) are intercorrelated with each other.

$$N(i) = \int_{-\infty}^{+\infty} D'(i')D(i'-i)di'$$

If the maximal amplitude E of the result of intercorrelation between D(i) and D'(i) is sufficient, then j is the considered number of the activated zone. Otherwise, the signal S(t) generated by the sensor corresponds to a false alarm. In some embodiments, the maximal amplitude E of the result of intercorrelation between D(i) and D'(i) is sufficient when the value is 0.5 or greater. In more preferred embodiments, the maximal amplitude E of the result of intercorrelation between D(i) and D'(i) is sufficient when the value is 0.4 or greater. In still more preferred embodiments, the maximal amplitude E of the result of intercorrelation between D(i) and D'(i) is sufficient when the value is 0.3 or greater. In some embodiments, the threshold value that determines whether the maximal amplitude E of the result of intercorrelation between D(i) and D'(i) is sufficient is experimentally determined during a calibration phase. In this calibration phase, the surface is tapped at known positions and the intercorrelation between D(i) and D'(i) is computed for these test taps. This process continues until a maximal amplitude E that distinguishes between correct identification of active zones versus false alarms is identified. When the intercorrelation between D(i) and D'(i) has a maximal amplitude E that is considered sufficient, as defined above, the sensed signal S(t) is deemed sufficiently similar to the predetermined signal Rj(t).

Other comparison functions. An example in which a sensed signal S(t) has been compared to a library of sensed signals using intercorrelation techniques has been describe. However, the present invention is not limited to such techniques. Any method of comparison of a sensed signal S(t) to a library of predetermined signals Ri(t) can be used in the present invention. For example, signal recognition using a finite impulse response filter or an infinite impulse response filter can be used. A finite impulse response filter produces an output, y(n), that is the weighted sum of the current and past inputs, x(n). An infinite impulse response (IIR) filter produces an output, y(n), that is the weighted sum of the current and past inputs, x(n), and past outputs. See, for example, Wagner and Barr, "Introduction to Digital Filters," Embedded Systems Programming, December 2002, pp. 47-48; U.S. Pat. Nos. 6,826,226 and 6,825,857, each of which is hereby incorporated by reference in its entirety. In some embodiments, voice recognition using techniques such as linear predictive coding is used. For more information on exemplary voice recognition techniques that can be used in the present invention, see Adams and Russ, *Sourcebook of Automatic Identification and Data Collection*, Van Nostrand Reinhold, New York, 1990; Cater, *Electronically Hearing: Computer Speech Recognition*, Howard W. Sams & Co., Indianapolis, Ind., 1984; Fourcin et al., editors, *Speech Input and Output Assessment*, Ellis Horwood Limited, Chichester, UK, 1989; Yannakoudakis and Hutton, *Speech Synthesis and Recognition Systems*, Ellis Horwood Limited, Chichester, UK, 1987, each of which is incorporated by reference in its entirety. Furthermore, neural networks can be used. See, for example, Duda et al., *Pattern Classification*, 2001, John Wiley & Sons, Inc., New York, pp. 282-347; and Hastie et al., *The Elements of Statistical Learning*, 2001, Springer-Verlag, New York, pp. 347-369, each of which is incorporated by reference.

Types of signals measured. In the present invention, sensed signals S(t) and predetermined signals Ri(t) are measured. The predetermined signals Ri(t) are typically measured and stored in a library at a time prior to measurement of the sensed signals S(t). In the present invention S(t) and each Ri(t) represents the measurement of any type of wave that can propagate through a solid.

In air, sound travels by compression and rarefaction of air molecules in the direction of travel. However, in solids, molecules can support vibrations in other directions, hence, a number of different types (modes) of sound waves are possible. In particular, in solids, sound waves can propagate in two principle modes that are based on the way the particles oscillate. Sound can propagate as longitudinal waves and shear waves. See D. Royer and E. Dieulesaint, *Elastic Waves in Solids* 1 (Springer-Verlag, 1999).

With some geometries, sound waves are decomposed into surface waves, or plate waves. See for example, Victorov, *Rayleigh and Lamb Waves* (Plenum, New York, 1967); Pollard, *Sound Waves in Solids* (Pion Limited, London, 1977); and Hecht and Jajac, *Optics* (Addison-Wesley Publishing Company, 1979), each of which is hereby incorporated by reference in its entirety. Signals S(t) and each Ri(t) can represent any of these propagation modes.

In longitudinal waves, the oscillations occur in the longitudinal direction or the direction of wave propagation. Since compressional and dilational forces are active in these waves, they are also called pressure or compressional waves. They are also sometimes called density waves because their particle density fluctuates as they move. Compression waves can be generated in gasses and liquids, as well as solids because the energy travels through the atomic structure by a series of compression and expansion (rarefaction) movements.

In the transverse or shear wave, the particles oscillate at a right angle or transverse to the direction of propagation. Shear waves require an acoustically solid material for effective propagation and, therefore, are not effectively propagated in materials such as liquids or gasses. Shear waves are relatively weak when compared to longitudinal waves. In fact, shear waves are usually generated in materials using some of the energy from longitudinal waves by mode conversion.

Surface or Rayleigh waves travel the surface of a solid material penetrating to a depth of one wavelength. The particle movement has an elliptical orbit. Rayleigh waves are sensitive to surface defects.

Plate waves include Raleigh waves and Lamb waves. Lamb waves are a complex vibrational wave that travels through the entire thickness of a material. Propagation of Lamb waves depends on density, elastic, and material properties of a component, and they are influenced by a great deal by selected frequency and material thickness. With Lamb waves, a number of modes of particle vibration are possible, but the two most common are symmetrical and asymmetrical. The complex motion of the particles is similar to the elliptical orbits for surface waves. There exists both symmetric Lamb waves, anti-symmetric Lamb waves.

Additional wave forms that can be measured in order to obtain signals S(t) and Ri(t) include Stonely waves (Leaky Raleigh waves), Sezawa waves (antisymmetric mode), flexural plate waves (FPW), and surface-skimming bulk waves (SSBW). In a preferred embodiment, anti-symmetric Lamb waves are measured in order to form signals S(t) and Ri(t).

Frequency range measured or considered. In the present invention, a broad range of frequencies can be polled in order to obtain the acoustic signals that form the basis of the sensed signals S(t) and each of the predetermined signals Ri(t). In a preferred embodiment, frequencies in the range of 0 kilohertz (kHz)-20 kHz are measured and/or used to form the basis of sensed signal S(t) and each of the predetermined signals Ri(t). At such frequencies, essentially anti-symmetric Lamb waves are measured. However, other frequency bandwiths can be used. In fact, any frequency bandwidth emitted by a wave propagating in a solid can be used. For example, compressional and shear waves at megahertz frequencies can be measured.

Time interval. Acoustic signals measured to form the basis of the sensed signal S(t) and each of the predetermined signals Ri(t) are measured by an acoustic sensor using discrete time intervals. The amount of time (time interval) an acoustic signal is measured by an acoustic sensor in order to obtain signals S(t) and Ri(t) depends on the composition and size of object 5. However, in general, a time intervals ranging anywhere between 5 milliseconds (ms) to 100 ms is used in some embodiments of the present invention. Other time ranges are possible. Furthermore, in some embodiments, multiple measurements of the acoustic signal are taken, each having a time interval between 5-100 ms, in order to derive S(t) and Ri(t).

Signal to noise ratio. In some embodiments, in order to be processed into an S(t) or an Ri(t), a measured acoustic signal has a certain minimum signal to noise ratio. In some embodiments, this minimum required signal to noise ratio depends on whether the measured acoustic signal is to be used as a predetermined signal Ri(t) or as a sensed signal S(t). In one such embodiment, acoustic signals used to form the basis of a predetermined signal Ri(t) have a minimum of a 20 decibel (dB) signal to noise ratio over the entire frequency bandwidth used to form the predetermined signal Ri(t). Further, in this embodiment, acoustic signals used to form the basis of the sensed signal have a minimum of a 6 dB signal to noise ratio over the entire frequency bandwidth used to form the predetermined signal S(t). In some embodiments, a measured acoustic signal (e.g., Lamb waves) are not discarded just because a portion of the measured frequency range falls below the required signal to noise range. In such embodiments, those frequencies in the measured frequency range that fall below the required minimum signal to noise threshold are considered to be "zero" or not present. Thus, in such embodiments, the minimum signal to noise threshold is only required in a portion of the measured frequency bandwidth.

In some embodiments, the minimum signal to noise threshold required for all or a portion of the measured frequency bandwidth of the acoustic signal used to form the basis of S(t) is 4 dB or greater, 5 dB or greater, 6 dB or greater or 10 dB or greater. In some embodiments, the minimum signal to noise threshold required for all or a portion of the measured frequency bandwidth of the acoustic signal used to form the basis of Ri(t) is 10 dB or greater, 15 dB or greater, 20 dB or greater, or 30 dB or greater.

Acoustic signal normalization. Many processes by which sensed signal S(t) are compared with predetermined signals Ri(t) have been described (e.g., intercorrelation). In preferred embodiments, sensed signals S(t) and predetermined signals Ri(t) are normalized prior to such comparisons. Such normalization can occur in the time dimension, the frequency dimension, or both the time dimension and the frequency dimension. In one embodiment, to normalize an acoustic signal in the time dimension, the energy values measured for the acoustic signal across the time interval in which the signal was measured (e.g., 5 ms to 100 ms) are normalized to unity. When such a normalized signal is intercorrelated with itself, the maximum value of the correlation is equal to one. When such a signal is intercorrelated with another normalize signal, the maximum value of the intercorrelation result is less than 1.

To normalize an acoustic signal in the frequency dimension, the energy values measured for the acoustic signal across the frequency range in which the signal was measured (e.g., 0 kHz-20 kHz) is normalized to unity.

Figure 10:
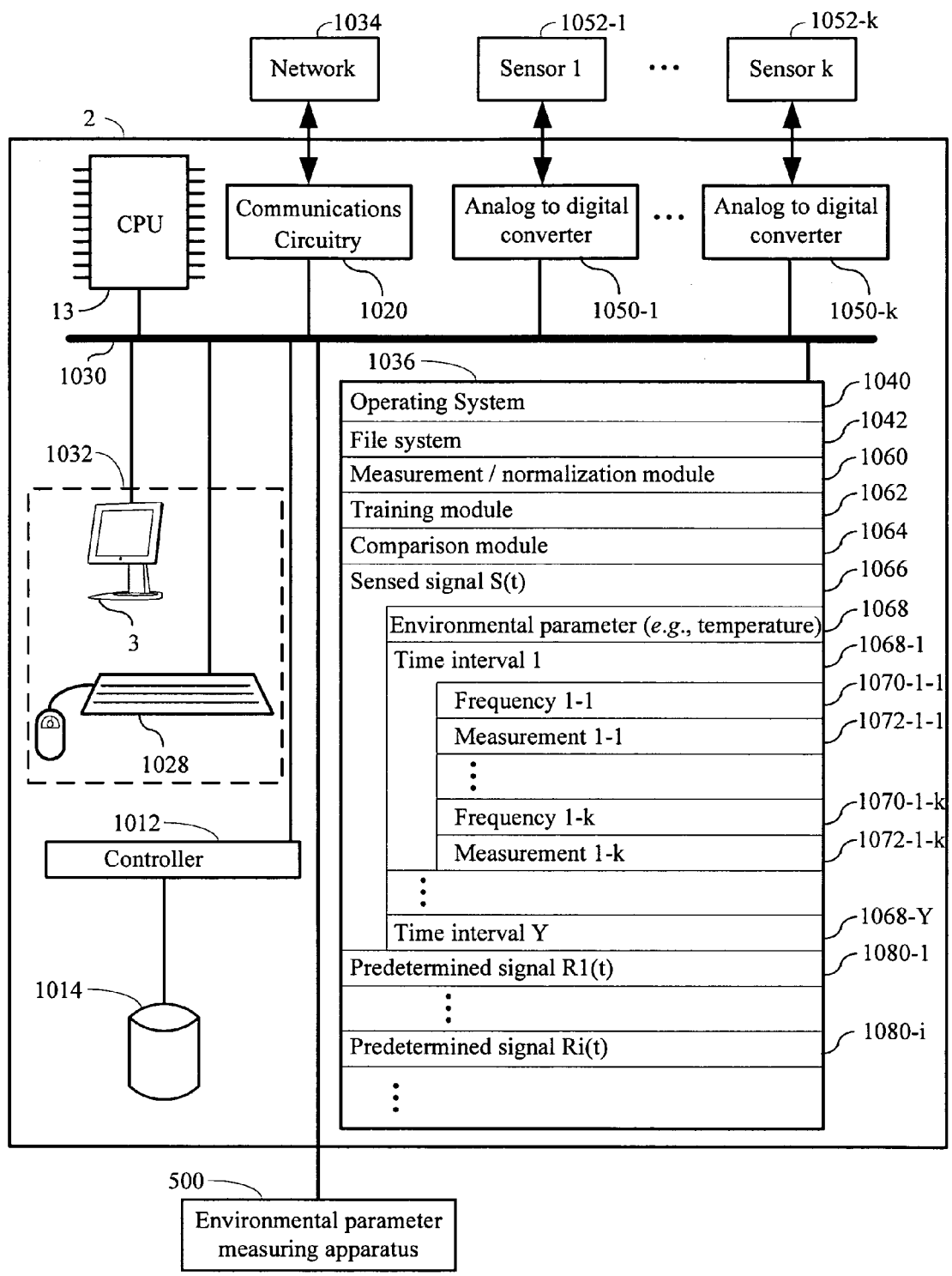
FIG. 10 is a illustrative computer in accordance with an embodiment of the present invention.

Linear temporal dilation or contraction. In various embodiments, S(t) and/or each Ri(t) is corrected for one or more environmental parameters such as temperature. Referring to FIG. 10, in such embodiments, an apparatus 500 for measuring the one or more environmental parameters is used to communicate information about the one or more environmental parameters to central processing unit 2. In one such embodiment, the environmental parameter for which correction is applied is temperature. When the temperature of the object changes, the acoustic velocity within the object changes. The relative value of the change in the acoustic velocity depends on the composition of the object and ranges up to a few percent for a temperature range of 0° C. to 40° C.

Thus, in one embodiment, acoustic signals representing predetermined signals Ri(t) for each active zone on surface 9 of object 5 are measured at a given reference temperature $T_{ref}$ as determined by apparatus 500, which in this embodiment, is a thermocouple or some other apparatus capable of measuring the temperature of surface 9 (or of object 5). Then, acoustic signals representing the sensed signal S(t) are measured at some temperature $T_{meas}$. Before comparison of S(t) to one or more Ri(t), a correction a is applied to either S(t) or each Ri(t) to account for difference in velocity of the waves being measured due to the difference in temperatures $T_{ref}$ and $T_{meas}$. The value α is a function of $T_{ref}$ and $T_{meas}$, as well as the composition of object 5. In some cases, this correction can be obtained from published references. However, in other embodiments, the value α is obtained through calibration experiments. In one embodiment, such calibration experiments involve measuring acoustic signals representing each Ri(t) at several different temperature ranges. In another embodiment, such calibration experiments involve measuring the speed of the acoustic waves across surface 9 at a plurality of different temperatures. One example of this latter calibration technique, in which acoustic wave velocity as a function of temperature is determined, is described by Degertekin et al., "In-situ ultrasonic thermometry of semiconductor wafers," Ultrasonics Symposium, 1993, Proceedings., IEEE 1993, pp. 375-377, vol. 1, which is hereby incorporated by reference in its entirety. Degertekin et al., report a temperature measurement technique based on the temperature dependence of acoustic wave velocity in silicon wafers. Zeroth order antisymmetric Lamb wave were excited in the wafer using the quartz pins that support the wafer during processing. Extensional waves were generated in the quartz pin by a PZT-SH transducer and the acoustic energy were coupled to the Lamb wave at the contact between the sharpened end of the pin and the wafer surface. Detection was done by a similarly modified quartz pin. By measuring the time of flight of the Lamb wave in the wafer between the two pins, Degertekin et al. were able to monitor the wafer temperature in-situ in the 20-1000° C. range with ±1 accuracy. With eight spring loaded pins placed on a circular array around the wafer, 28 different measurements were made giving information about different regions. Using tomographic reconstruction techniques, the spatial temperature distribution with a 2 cm pixel size was then calculated. Excellent agreement was observed between the readings of thermocouples attached to the wafer, and calculated values from ultrasonic tomography.

Nonlinear temporal dilation or contraction. In some embodiments, nonlinear dilation or contraction in frequency of the reference signals Ri(t) and/or the sensed signal S(t) is made. Such nonlinear approaches are well suited when surface 9 and/or object 5 is heterogeneous. For example, object 5 could be glass panel with metallic corners and rubber between the glass and the metal and in which sensors 6 are applied on the metallic part whereas the active zones 10 are realized on the glass surface. In such embodiments, the frequency signals R'$_i$(ω) can be replaced by R'$_i$(ω'), with $$\omega' = \frac{\omega \beta^2}{1 + \sqrt{(\omega/\omega_N) \cdot (\beta - 1)}},$$

where $\omega_N$ is equal to half the sampling frequency of the processing device, and β is a coefficient determined theoretically or experimentally. Alternatively, the reference signals from the library of signals are left unchanged, and the signal S'(ω) is replaced by S'(ω'), where ω' is as defined above.

Number of stored predetermined signals Ri(t). The number of stored predetermined signals Ri(t) is application dependent. In some embodiments, each predetermined signal Ri(t) corresponds to a different active zone 10. In such embodiments, the number of predetermined signals Ri(t) that can be used is a function of the computational power and RAM memory size of the computer that performs the calculations. As a nonlimiting example, the inventors have successfully experimented with up to 544 active zones 10 using a Pentium III processor operating at 500 MHz and equipped with 256 Mbytes of RAM. With more powerful processors, and more random memory and/or the use of multiple processors, a sensed signal S(t) can be compared with 1000 or more predetermined signals Ri(t), 2000 or more predetermined signals, or between 100 and 10,000 predetermined signals Ri(t). At a minimum, a sensed signal S(t) is compared with one predetermined signal Ri(t). In some embodiments, there are between 5 and 100 active zones, 50 and 200 active zones, more than 200 active zones, or less than 1000 active zones.

Computer systems, computer program products, and computer readable media. The methods of the present invention can be implemented on a device 2 such as that depicted in FIG. 5. FIG. 10 provides more details of the feature of device 2. Device 2 is preferably a computer system 10 having:

- one or more central processing units 13;
- a main non-volatile storage unit 1014, for example a hard disk drive, for storing software and data, the storage unit 1014 controlled by storage controller 1012;
- a system memory 1036, preferably high speed random-access memory (RAM), for storing system control programs, data, and application programs, comprising programs and data loaded from non-volatile storage unit 1014; system memory 1036 may also include read-only memory (ROM);
- a user interface 1032, comprising one or more input devices (e.g., keyboard 1028) and a display 3 or other output device;
- an optional network interface card 1020 for connecting to any wired or wireless communication network 1034 (e.g., a wide area network such as the Internet);
- one or more acoustic sensors 1052, each coupled to an analog to digital converter 1050 for measuring acoustic signals in the surface 9 of an object 5;
- one or more environmental parameter measuring apparatus 500 (e.g., a thermocouple) for measuring environmental parameters associated with the surface 9 of an object 5 (e.g., the temperature of the object); and
- an internal bus 1030 for interconnecting the aforementioned elements of the system.

Operation of computer 2 is controlled primarily by operating system 1040, which is executed by a central processing unit 13. As illustrated in FIG. 10, operating system 1040 can be stored in system memory 1036. In addition to operating system 1040, in a typical implementation, system memory 1036 includes:

file system 1042 for controlling access to the various files and data structures used by the present invention;

a measurement/normalization module 1060 for measuring acoustic signals using sensors 1052;

a training module 1062 for building a library of predetermined signals, where each predetermined signal corresponds to an active zone 10 on surface 9 of object 5; and a comparison module 56 for comparing predetermined signals Ri(t) to a sensed signal S(t).

In addition to the above-identified components, memory 1036 stores a sensed signal S(t), designated as sensed signal 1066 in FIG. 10. There are a variety of aspects of sensed signal 1066 that can be stored in memory 1036. Some of these aspects are detailed in FIG. 10. For example, an environmental parameter 1068 can be measured when sensed signal 1066 is measured. Environmental parameter 1068 is measured by an environmental parameter measuring apparatus 500 that typically is connected to object 5. A preferred environmental parameter 1068 is the temperature of object 5. The environmental parameter 1068 can be used to apply a correction to either the sensed signal S(t) or the predetermined signals Ri(t). Sensed signal S(t) is measured over time using one or more analog measuring devices 1052. These analog signal are sampled by analog to digital converter at discrete time points 1068. Measurements 1072 of a plurality of frequencies can be made at each of these discrete time points for a plurality of different frequencies 1070 in a desired frequency range. The sampling rate is dependent upon the capabilities of analog to digital converters 1050. For instance, the inventors have used an analog to digital converter (sound card) with a maximum sampling rate of 44100 hertz, and an analog-to-digital (ADC) precision of 16 bits. Thus, in such an embodiment, each sensed signal 1066 and/or predetermined signal has a precision of 16 bits. However, ADC precision of less than 16 bits can be used effectively in the present invention. In fact, an ADC precision of 10 bits or less can be used.

In some embodiments, the signal S(t) is stored in memory 1036 as an n-bit code that represents the signal across the entire desired bandwidth and the entire time interval of measurement rather than in the method illustrated in FIG. 10. A portion of the bits in the n-bit code represent the measured signal across time trenches and another portion of the n-bit code represents the measured signal across frequency trenches. An example of a 16-bit code in accordance with this embodiment of the invention has been presented above.

In addition to storage of characteristics of the sensed signal S(t), memory 1036 stores, or can access, a library of predetermined signals 1080. Each predetermined signal includes the components detail above for sensed signal 1066, including one or more optional environmental parameters, time intervals, and measurements as a function of frequency in a desired frequency range.

As illustrated in FIG. 10, computer 2 comprises software program modules and data structures. The data structures stored in computer 2 include the sensed signal S(t) and the predetermined signal Ri(t). Each of these data structures can comprise any form of data storage system including, but not limited to, a flat ASCII or binary file, an Excel spreadsheet, a relational database (SQL), or an on-line analytical processing (OLAP) database (MDX and/or variants thereof). Furthermore, any component of the software module and sensed signals can be stored in memory 1036 and/or non-volatile storage unit 1014. In fact, some portions of each software module and signals R(t) and Ri(t) can be stored in memory 1036 while other portions of such software modules and signals R(t) and Ri(t) are stored in non-volatile storage unit 1014. Moreover, there is no requirement that non-volatile storage unit be housed within computer 2. Non-volatile storage unit may be stored in any computer or other form of device that is addressable by optional network 1034.

In some embodiments, each of the data structures (e.g., sensed signal 1066 and/or predetermined signals 1080) that are stored in or are accessible to system 2 are single data structures. In other embodiments, such data structures in fact comprise a plurality of data structures (e.g., databases, files, archives) that may or may not all be hosted by the same computer 2. For example, in some embodiments, each predetermined signal 1080 is stored in one file or across a plurality of files or databases that are stored either on computer 2 and/or on computers that are addressable by computer 2 across wide area network 1034.

It will be appreciated that many of the modules (e.g., measurement normalization module 1060, training module 1062, comparison module 1064) and data structures (e.g., sensed signal 1066, predetermined signal 1080) illustrated in FIG. 10 can be located on one or more remote computers. As such, any arrangement of the data structures and software modules illustrated in FIG. 10 on one or more computers is within the scope of the present invention so long as these data structures and software modules are addressable with respect to each other across network 1034 or by other electronic means. Thus, the present invention fully encompasses a broad array of computer systems.

Rejection of noise. Several methods have been disclosed for ensuring that a sensed signal S(t) is not in fact noise. These technique includes a minimum signal to noise threshold and minimum required intercorrelation values between D(t) and D'(t). The present invention encompasses additional methods for rejecting noise. For example, a comparison of a sensed signal S(t) measured from surface 9 can be compared to the energy of the corresponding air signal, which should be weaker than the energy resulting from the impact on surface 9. If the air signal is below a minimum threshold energy level and/or if the energy of the signal sensed in surface 9 does not exceed the energy sensed in the air by a threshold amount, the sensed signal S(t) is rejected as noise. The value of this threshold is application and configuration dependent and is generally deduced during a calibration phase. In another example, a comparison is made of the correlation result that is achieved when the location of impact I has been assigned with those correlations that are achieved when the location of impact is assigned to points on surface 9 that are proximate to the location of impact I. If the correlations between S(t) and Ri(t) are not weaker by a threshold amount at these proximate locations, then the signal S(t) is rejected as noise. The value of this threshold is application and configuration dependent and is generally deduced during a calibration phase.

Figure 11:
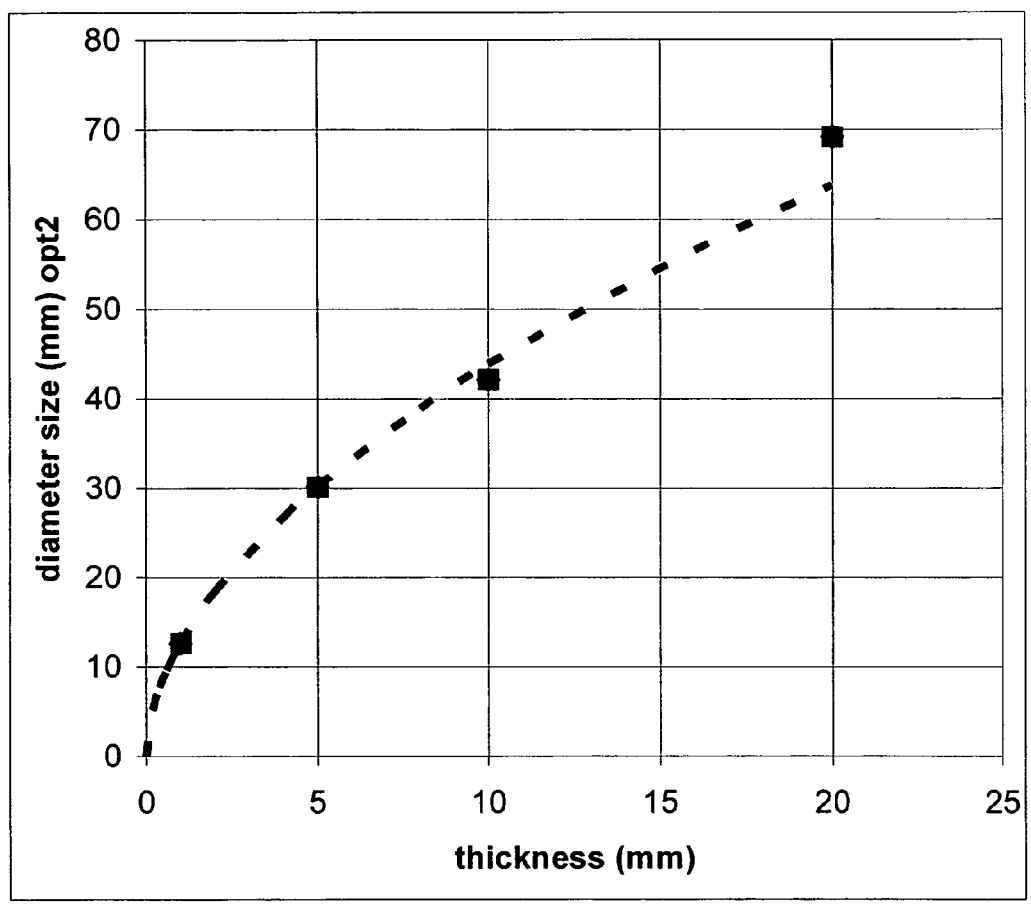
FIG. 11 is a graph illustrating minimum active zone size as a function of object thickness computed in accordance with the present invention. In the various figures, the same references designate identical or similar elements.

Size of active zones 10. The minimum suitable dimensions of the active zones 10 on surface 9 is typically a function of the material object 5 is made of as well as the thickness of the material. FIG. 11 illustrates numerical calculation results in accordance with the present invention for a glass panel having a useful frequency bandwidth of 11025 Hz. In particular, FIG. 11 illustrates the minimum possible size of an active zone as a function of the thickness of the glass panel. Thus, FIG. 11 illustrates that for the case in which object 5 is made out of glass, the minimum required size of active zone 10 is a function of the thickness of the object.

In some embodiments, object 5 is dimensioned and configured such that one or more active zones 10 on a surface 9 of the object can be encompassed by a circle having a diameter of less than 5 millimeters, less than 10 millimeters, less than 15 millimeters, or less than 100 millimeters.

CONCLUSION

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a computer readable storage medium. For instance, the computer program product could contain the program modules shown in FIG. 10. These program modules may be stored on a CD-ROM, DVD, magnetic disk storage product, or any other computer readable data or program storage product.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed:

1. A computer program product implemented by a computer system, the computer program product comprising a computer readable storage medium and a computer program mechanism embedded therein, the computer program mechanism comprising:

instructions for measuring at least one sensed signal from one or more acoustic waves generated by an impact on a surface of an object forming an acoustic interface, the surface provided with at least one acoustic sensor;

instructions for localizing a position of said impact on said surface by processing of said at least one sensed signal, the processing characterized by a comparison of a sensed signal in the at least one sensed signal with at least one predetermined signal in a plurality of predetermined signals, wherein each respective predetermined signal in said plurality of predetermined signals corresponds to an active zone in a plurality of active zones on said surface, and each respective predetermined signal in said plurality of predetermined signals represents a signal that is sensed when a reference impact is generated on the active zone in said plurality of active zones that corresponds to the respective predetermined signal, and wherein, the position of the impact is associated with an active zone in said plurality of active zones by said localizing when the sensed signal is sufficiently similar to said predetermined signal corresponding to the active zone.

2. The computer program product of claim 1 wherein said instructions for localizing comprise instructions for comparing the sensed signal with said plurality of predetermined signals, each respective predetermined signal in said plurality of predetermined signals corresponding to a signal sensed when an impact is generated on a corresponding one of said active zones in said plurality of active zones.

3. The computer program product of claim 1, wherein
said at least one acoustic sensor comprises a plurality of acoustic sensors;
said at least one sensed signal comprises a plurality of sensed signals, wherein each sensed signal in said plurality of sensed signals is detected by a different acoustic sensor in said plurality of acoustic sensors; and
said instructions for localizing comprise comparing, using a first comparison technique, a first sensed signal in the plurality of sensed signals with one or more predetermined signals in said plurality of predetermined signals that were measured using the same acoustic sensor that sensed said first sensed signal, wherein said comparing of said first sensed signal is performed independent of all other comparisons of sensed signals.

4. The computer program product of claim 3, wherein said instructions for localizing further comprise comparing, using a second comparison technique, a second sensed signal in the at least one sensed signals with one or more predetermined signals in said plurality of predetermined signals that were measured using the same acoustic sensor that sensed said second sensed signal, wherein said first comparison technique and said second comparison technique are different from one another.

5. The computer program product of claim 3, the computer program mechanism comprising instructions for repeating said localizing for each respective sensed signal in the plurality of sensed signals.

6. The computer program product of claim 1, wherein said at least one acoustic sensor comprises a plurality of acoustic sensors that sense said at least one sensed signal at several different magnitudes.

7. The computer program product of claim 1 wherein said at least one acoustic sensor consists of one acoustic sensor or two acoustic sensors.

8. The computer program product of claim 1 wherein said at least one acoustic sensor consists of a single acoustic sensor.

9. The computer program product of claim 1, the computer program mechanism further comprising instructions for experimentally determining a predetermined signal in said plurality of predetermined signals by receiving a measurement of an acoustic wave caused by at least one impact in an active zone on the surface of said object, wherein said active zone corresponds to the predetermined signal.

10. The computer program product of claim 1, the computer program mechanism further comprising instructions for experimentally determining a predetermined signal in said plurality of predetermined signals by receiving a measurement of an acoustic wave caused by at least one impact in an active zone on a surface of a reference object that is identical to or very similar to said object, wherein said active zone corresponds to the predetermined signal.

11. The computer program product of claim 1, wherein said comparison of said at least one sensed signal with said at least one predetermined signal comprises comparison by intercorrelation.

12. The computer program product of claim 1 wherein said comparison of said sensed signal with said at least one predetermined signal comprises comparison by voice recognition, signal recognition, shape recognition or recognition by a neural network.

13. The computer program product of claim 1, wherein said position of said impact is associated with either (i) a unique active zone in said plurality of active zones or (ii) no active zone in said plurality of active zones.

14. The computer program product of claim 1, wherein each active zone in said plurality of active zones corresponds to a predetermined information element and, when the position of the impact is associated with an active zone, an electronic device is made to use the predetermined information element corresponding to the active zone.

15. The computer program product of claim 14 wherein the predetermined information element is a command, a digit, a letter, or a position on said surface.

16. The computer program product of claim 1, wherein the surface of the object forming an acoustic interface comprises a plurality of active zones and the instructions for localizing comprise:
   instructions for performing a respective intercorrelation between the sensed signal S(t) and each said predetermined signal $R_i$(t) in said at least one predetermined signals, wherein i is a natural integer between 1 and n and wherein i designates an active zone in said plurality of active zones, thereby obtaining one or more respective intercorrelation functions Ci(t);
   instructions for determining a potentially activated active zone j corresponding to an intercorrelation function Cj(t), in the one or more respective intercorrelation functions Ci(t), wherein the intercorrelation function Cj(t) has a maximum amplitude greater than those of the other intercorrelation functions Ci(t);
   instructions for determining the distribution D(i) of the amplitude maxima of the intercorrelation functions wherein:

$D(i) = \text{Max}(Ci(t))$;

instructions for determining the distribution D'(i) of the amplitude maxima of the intercorrelation function C'i(t) between (i) the predetermined signal corresponding to the potentially activated zone, Rj(t), and (ii) each respective predetermined signal Ri(t) wherein:

$D'(i) = \text{Max}(C'i(t))$;

instructions for computing an intercorrelation between D'(i) and D(i); and instructions for determining whether the impact was generated on the active zone j as a function of a level of correlation between the distributions D(i) and D'(i) computed by said intercorrelation between D'(i) and D(i).

17. The computer program product of claim 1, the computer program mechanism further comprising:
   instructions for extracting data from a sensed signal in said at least one sensed signal representative of a sensed characteristic of the sensed signal; and
   instructions for extracting data from a predetermined signal in said plurality of predetermined signals representative of a reference characteristic of the predetermined signal; wherein
   said comparison of the sensed signal with the least at one predetermined signals comprises comparing the sensed characteristic to the reference characteristic.

18. The computer program product of claim 17 wherein said sensed characteristic is formulated as a first code and wherein said comparison of the sensed signal with the at least one predetermined signals comprises comparing the first code with a table of codes, wherein each code in said table of codes represents data from a predetermined signal corresponding to an active zone in said plurality of active zones.

19. The computer program product of claim 1, wherein the object forming an acoustic interface comprises a plurality of active zones and wherein said instructions for localizing comprise:
   instructions for determining a plurality of resemblance values, each resemblance value representative of a resemblance between the sensed signal and a predetermined signal in said plurality of predetermined signals;
   instructions for associating the position of the impact (I) with a plurality of adjacent active zones as a function of said plurality of resemblance values; and
   instructions for identifying the position of the impact (I) on the surface based on a function of the resemblance values attributed to the plurality of adjacent active zones associated with said impact.

20. The computer program product of claim 19, wherein said instructions for identifying the position of the impact (I) on the surface based on said function comprises correlating the resemblance values corresponding to the plurality of adjacent active zones to one or more theoretical resemblance values computed for said plurality of adjacent active zones for an impact generated in said position on the surface.

21. The computer program product of claim 20 wherein a theoretical resemblance value in said one or more theoretical resemblance values is a function of the position of the impact on the surface wherein said function is determined prior to said localizing for said plurality of adjacent active zones.

22. The computer program product of claim 1 wherein said comparison of the sensed signal with at least one predetermined signal in the plurality of predetermined signals comprises comparing a phase of a predetermined signal in the plurality of predetermined signals with a phase of the sensed signal.

23. The computer program product of claim 22, the computer program mechanism further comprising:
   instructions for computing a Fourier transform $R_i(\omega) = |R_i(\omega)| \cdot e^{j\Phi i(\omega)}$ of a predetermined signal in the plurality of predetermined signals that corresponds to an active zone i in said plurality of active zones;
   instructions for computing a Fourier transform $S(\omega) = |S(\omega)| \cdot e^{j\Phi i(\omega)}$ of a sensed signal in the at least one sensed signals; wherein
said comparison of the sensed signal in the at least one sensed signal with said at least one predetermined signal in the plurality of predetermined signals comprises comparing:

$S'(\omega)$ to $R'_i(\omega)$ wherein,
   $S'(\omega)$ is a phase component of the Fourier transform of the sensed signal for those frequency bands $\omega$ in which the amplitude $|S(\omega)|$ is greater than a predetermined threshold; and
   $R'_i(\omega)$ is a phase component of the Fourier transform of the predetermined signal for those frequency bands $\omega$ in which the amplitude $|R_i(\omega)|$ is greater than a predetermined threshold.

24. The computer program product of claim 23, wherein the predetermined threshold is equal to the maximum of MAX/D and $|B(\omega)|$, where:
   MAX is a maximal value of the amplitude $|R_i(\omega)|$, a maximal value of amplitude $|R_i(\omega)|$ normalized in energy, or a maximal value of an envelope of an average of amplitude $|R_i(\omega)|$ normalized in energy,
   D is a constant, and
   $|B(\omega)|$ is an average of a plurality of noise spectra in the object forming an acoustic interface, acquired at different times.

25. The computer program product of claim 23, the computer program mechanism further comprising:
   instructions for computing, for each active zone i in the plurality of active zones, $Pi(\omega) = S'(\omega)$ multiplied by the conjugate of $R'(\omega)$;
   instructions for normalizing, for each active zone i in the plurality of active zones, $Pi(\omega)$;

instructions for obtaining a plurality of temporal functions, each temporal function Xi(t) in said plurality of temporal functions corresponding to an active zone i in the plurality of active zones, wherein Xi(t) for a respective active zone i is an inverse Fourier transform of the product Pi($\omega$) for the respective active zone; and instructions for attributing the signal S(t) to an active zone in the plurality of active zones as a function of said temporal functions.

26. The computer program product of claim 25, wherein the signal S(t) is attributed to the active zone corresponding to a temporal function having a maximum value that is greater than the maximum value of any other temporal function in said plurality of temporal functions.

27. A computer program product implemented by a computer system, the computer program product comprising a computer readable storage medium and a computer program mechanism embedded therein, the computer program mechanism comprising:

instructions for measuring a sensed signal caused by an impact on a surface of an object, wherein said surface is delineated into a plurality of active zones;

instructions for comparing said sensed signal with a library of predetermined signals, each predetermined signal in said library of predetermined signals corresponding to an active zone in said plurality of active zones; wherein when a correspondence between said sensed signal and a respective predetermined signal in said library of predetermined signals is sufficiently similar, a location of said impact is deemed to be in an active zone corresponding to said respective predetermined signal.

28. The computer program product of claim 27 wherein said instructions for comparing comprise intercorrelating said sensed signal with a predetermined signal in said library of predetermined signals.

29. The computer program product of claim 27 wherein said sensed signal is normalized prior to execution of said instructions for comparing.

30. The computer program product of claim 27, the computer program mechanism further comprising:

instructions for converting said sensed signal to a sensed code representative of said sensed signal and wherein said library of signals comprises a plurality of predetermined codes, each predetermined code representing a different predetermined signal in said plurality of predetermined signals; and wherein said instructions for comparing comprise comparing said sensed code with a predetermined code in said plurality of predetermined codes.

31. The computer program product of claim 30, wherein said sensed code is a 16-bit code wherein (a) the first eight bits of said 16-bit code are determined by a frequency spectrum of the sensed signal that is subdivided into eight predetermined frequency tranches $[f_k, f_{k+1}]$, wherein k=1 . . . 8 and wherein the bit of rank k is equal to 1 when a final energy value given by the spectrum at frequency $f_{k+1}$ is greater than an average energy value of an acoustic wave in the frequency tranches $[f_k, f_{k+1}]$ and 0 when a final energy value given by the spectrum at frequency $f_{k+1}$ is not greater than the average energy value of the acoustic wave in the frequency tranches $[f_k, f_{k+1}]$; and wherein (b) the last eight bits of the code are determined from the sensed signal when it is subdivided into nine predetermined temporal tranches $[t_k, t_{k+1}]$, wherein k=1 . . . 9 and wherein the bit of rank k+8 is equal to 1 when an average value of a signal power during the period $[t_k, t_{k+1}]$ is greater than an average value of the signal power during the period $[t_{k+1}, t_{k+2}]$, k=1 . . . 8, 0 when an average value of a signal power during the period $[t_k, t_{k+1}]$ is not greater than an average value of the signal power during the period $[t_{k+1}, t_{k+2}]$, k=1 . . . 8.

32. A computer comprising one or more digital signal processors and a memory, the memory storing a measurement module and a comparison module, wherein:

the measurement module comprises instructions, executed by the one or more digital signal processors, for receiving a measurement of a sensed signal, the sensed signal representative of an acoustic wave generated by an impact on a surface of an object, wherein said surface is delineated into a plurality of active zones; and the comparison module comprises instructions, executed by the one or more digital signal processors, for comparing said sensed signal to a predetermined signal in a library of predetermined signals; wherein, when said sensed signal is substantially similar to said predetermined signal, a location of the impact on said surface is deemed to be in an active zone corresponding to the predetermined signal, wherein an indication of the location of the impact is communicated to a memory or a display.

33. The computer of claim 32, the computer further comprising:

a training module comprising instructions, executed by the one or more digital signal processors, for building said library of predetermined signals; each predetermined signal in said library of predetermined signals representing an acoustic wave measured from an active zone in said plurality of active zones.

34. The computer of claim 32 wherein said acoustic wave is in a frequency range between 0 kilohertz (kHz) and 20 kHz.

35. The computer of claim 32 wherein the measurement model and the comparison module are embodied in said one or more digital signal processors, and wherein said memory is in said one or more digital signal processors, and wherein the one or more digital signal processors are an integral part of said object.

36. The computer of claim 32 wherein said instructions for comparing said sensed signal with said predetermined signal comprise intercorrelating said sensed signal with said predetermined signal.

37. The computer of claim 32 wherein said measurement of said sensed signal has a duration between 5 milliseconds and 100 milliseconds.

38. The computer of claim 32 wherein said sensed signal has a signal to noise ratio of 6 decibels or greater.

39. The computer of claim 32 wherein said predetermined signal has a signal to noise ratio of 20 decibels or greater.

40. The computer of claim 32, wherein the measurement module further comprises instructions for normalizing said sensed signal for energy in a time dimension.

41. The computer of claim 32, wherein the measurement module further comprises instructions for normalizing said sensed signal for energy in a frequency dimension.

42. The computer of claim 32, wherein the measurement module further comprises instructions for correcting said sensed signal for linear temporal dilation or contraction as a function of a temperature of said object at a time when said acoustic wave was generated.

43. The computer of claim 32, wherein said plurality of active zones comprises between 5 and 100 active zones.

44. The computer of claim 32, wherein said plurality of active zones comprises more than 200 active zones.

45. The computer of claim 32, wherein said plurality of active zones comprises less than 1000 active zones.

46. A system comprising:
- an object having a surface forming an acoustic interface, wherein said surface is delineated into a plurality of active zones;
- at least one acoustic sensor in communication with said surface such that one or more acoustic waves generated by an impact on said surface can be detected by said at least one acoustic sensor; and
- a processor comprising:
  - instructions for receiving one or more measurements by said at least one acoustic sensor, said one or more measurements comprising a sensed signal from said one or more acoustic waves generated by said impact on said surface; and
  - instructions for comparing said sensed signal to a predetermined signal in a library of predetermined signals; wherein, when said sensed signal is substantially similar to said predetermined signal, a location of the impact on said surface is deemed to be in an active zone corresponding to the predetermined signal.

47. The system of claim 46, wherein the processor is an integral component of said object.

48. The system of claim 46, wherein said object is a pane, a door, a window, a portable tray, a computer screen, a display panel, an interactive terminal, a toy, a vehicle dashboard, a rear of a front seat back of an automobile vehicle, a rear of an airplane seat, a wall, a floor, or a vehicle fender.

49. The system of claim 46, wherein an acoustic sensor in said at least one acoustic sensor is a piezoelectric sensor, a capacitive sensor, a magnetostrictive sensor, an electromagenetic sensor, an acoustic velocimeter, a micro-electro-mechanical system (MEMS), or an optical sensor.

50. The system of claim 46, wherein said one or more acoustic waves comprise a longitudinal wave, a shear wave, a surface wave, a plate wave, or an anti-symmetric Lamb wave.

\* \* \* \* \*